(12) United States Patent
Benjebbour et al.

(10) Patent No.: US 10,548,093 B2
(45) Date of Patent: Jan. 28, 2020

(54) RADIO BASE STATION, USER TERMINAL AND RADIO COMMUNICATION METHOD

(71) Applicant: NTT DOCOMO, INC., Tokyo (JP)

(72) Inventors: Anass Benjebbour, Tokyo (JP); Yoshihisa Kishiyama, Tokyo (JP); Yuuya Saitou, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 18 days.

(21) Appl. No.: 14/781,739

(22) PCT Filed: Mar. 6, 2014

(86) PCT No.: PCT/JP2014/055855
§ 371 (c)(1),
(2) Date: Oct. 1, 2015

(87) PCT Pub. No.: WO2014/162819
PCT Pub. Date: Oct. 9, 2014

(65) Prior Publication Data
US 2016/0037460 A1    Feb. 4, 2016

(30) Foreign Application Priority Data
Apr. 4, 2013   (JP) ................... 2013-078686

(51) Int. Cl.
*H04W 52/24* (2009.01)
*H04W 72/04* (2009.01)
(Continued)

(52) U.S. Cl.
CPC ......... *H04W 52/248* (2013.01); *H04L 1/0003* (2013.01); *H04W 72/042* (2013.01);
(Continued)

(58) Field of Classification Search
CPC . H04W 52/248; H04W 52/346; H04W 52/42; H04W 72/042; H04W 72/0453;
(Continued)

(56) References Cited

U.S. PATENT DOCUMENTS

| 8,259,658 B2 * | 9/2012 | Nishio | ............... H04B 7/12 |
| | | | 370/329 |
| 2001/0050926 A1 * | 12/2001 | Kumar | ............... H04H 20/30 |
| | | | 370/529 |

(Continued)

FOREIGN PATENT DOCUMENTS

| JP | 2011-250422 A | 12/2011 |
| JP | 2012-178849 A | 9/2012 |

(Continued)

OTHER PUBLICATIONS

International Search Report issued in PCT/JP2014/055855 dated Jun. 10, 2014 (2 pages).

(Continued)

*Primary Examiner* — Jenee Holland
(74) *Attorney, Agent, or Firm* — Osha Liang LLP

(57) ABSTRACT

The present invention is designed to make possible link adaptation that is suitable for future radio communication systems. A radio base station according to the present invention has a coding section that encodes downlink data for each of a plurality of user terminals, a modulation section that modulates the downlink data for each of the plurality of user terminals, and a transmission section that multiplexes the downlink data for each of the plurality of user terminals on a per subband basis, and transmits the downlink data for each of the plurality of user terminals by using transmission power that is allocated to each of the plurality of user terminals on a per subband basis.

6 Claims, 17 Drawing Sheets

(51) Int. Cl.

| | | |
|---|---|---|
| *H04L 1/00* | (2006.01) | |
| *H04W 88/08* | (2009.01) | |
| *H04W 88/02* | (2009.01) | |
| *H04L 5/00* | (2006.01) | |
| *H04W 52/14* | (2009.01) | |

(52) U.S. Cl.
CPC ........ *H04W 72/0453* (2013.01); *H04W 88/02* (2013.01); *H04W 88/08* (2013.01)

(58) Field of Classification Search
CPC ..... H04L 1/0003; H04L 1/0009; H04L 5/003; H04L 5/0044; H04L 5/0073
See application file for complete search history.

(56) References Cited

U.S. PATENT DOCUMENTS

| | | | | |
|---|---|---|---|---|
| 2002/0010001 | A1* | 1/2002 | Dahlman | H04L 1/0003 455/522 |
| 2005/0078707 | A1* | 4/2005 | Maltsev | H04L 5/0053 370/471 |
| 2005/0135493 | A1* | 6/2005 | Maltsev | H04L 1/0071 375/260 |
| 2005/0232135 | A1* | 10/2005 | Mukai | H04L 5/0007 370/208 |
| 2006/0013168 | A1* | 1/2006 | Agrawal | H04B 7/2656 370/335 |
| 2006/0034381 | A1* | 2/2006 | Ionescu | H04B 7/0417 375/267 |
| 2007/0004337 | A1* | 1/2007 | Biswas | H04L 25/0204 455/63.1 |
| 2007/0270170 | A1 | 11/2007 | Yoon et al. | |
| 2007/0297323 | A1* | 12/2007 | Seki | H04L 5/023 370/208 |
| 2008/0032726 | A1* | 2/2008 | Tajima | H04L 1/0003 455/509 |
| 2008/0240217 | A1* | 10/2008 | Lee | H04B 17/336 375/227 |
| 2009/0141648 | A1* | 6/2009 | Imamura | H04L 1/0016 370/252 |
| 2009/0185502 | A1* | 7/2009 | Sung | H04W 16/18 370/252 |
| 2009/0196362 | A1* | 8/2009 | Song | H04B 7/0408 375/260 |
| 2009/0296674 | A1* | 12/2009 | Ekl | H04W 8/005 370/338 |
| 2010/0023830 | A1* | 1/2010 | Wengerter | H04L 1/0025 714/748 |
| 2010/0034077 | A1* | 2/2010 | Ishii | H04J 11/00 370/210 |
| 2010/0246711 | A1* | 9/2010 | Kishigami | H04L 5/0039 375/295 |
| 2010/0322132 | A1* | 12/2010 | Ramakrishna | H04L 1/0038 370/312 |
| 2011/0128903 | A1* | 6/2011 | Futaki | H04W 72/005 370/312 |
| 2011/0302480 | A1* | 12/2011 | Cheng | H04B 7/0452 714/800 |
| 2012/0113794 | A1* | 5/2012 | Roman | H04B 7/0452 370/201 |
| 2012/0120881 | A1* | 5/2012 | Kalhan | H04L 5/0007 370/329 |
| 2012/0322492 | A1* | 12/2012 | Koo | H04B 7/022 455/517 |
| 2013/0051344 | A1* | 2/2013 | Miki | H04L 1/1861 370/329 |
| 2013/0148637 | A1* | 6/2013 | Yang | H04W 72/042 370/336 |
| 2013/0170466 | A1* | 7/2013 | Nishio | H04L 5/0007 370/329 |
| 2013/0195032 | A1* | 8/2013 | Goransson | H04W 52/16 370/329 |
| 2013/0223394 | A1* | 8/2013 | Nishio | H04L 5/0048 370/329 |
| 2013/0265951 | A1* | 10/2013 | Ng | H04W 72/042 370/329 |
| 2013/0281148 | A1* | 10/2013 | Seyama | H04W 52/243 455/522 |
| 2013/0336288 | A1* | 12/2013 | Tu | H04W 36/0077 370/331 |
| 2014/0029562 | A1 | 1/2014 | Kishiyama | |
| 2014/0044091 | A1 | 2/2014 | Kishiyama | |
| 2014/0177492 | A1* | 6/2014 | Sun | H04L 5/0094 370/280 |
| 2014/0355469 | A1* | 12/2014 | Kang | H04J 11/005 370/252 |
| 2014/0376461 | A1* | 12/2014 | Park | H04W 16/14 370/329 |

FOREIGN PATENT DOCUMENTS

| | | |
|---|---|---|
| JP | 2013-009289 A | 1/2013 |
| WO | 2007/133051 A2 | 11/2007 |
| WO | 2007/133051 A3 | 11/2007 |
| WO | 2012/090327 A1 | 7/2012 |
| WO | 2012/161081 A1 | 11/2012 |

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTran (E-UTRAN) (Release 8)"; Dec. 2008 (18 pages).
Office Action issued in corresponding Japanese application No. 2013-078686, dated Nov. 4, 2015 (5 pages).
Extended European Search Report dated Oct. 7, 2016, in corresponding European Patent Application No. 14778830.1 (10 pages).
XP032114760 "Non-orthogonal Access with SIC in Cellular Downlink for User Fairness Enhancement", Tomida et al., 2011 International Symposium on Intelligent Signal Processing and Communication System (ISPACS), IEEE, Dec. 7-9, 2011 (6 pages).
XP032263805 "Performance of Non-orthogonal Access with SIC in Cellular Downlink Using Proportional Fair-Based Resource Allocation", Otao, et al., 2012 International Symposium on Wireless Communication System, IEEE, pp. 476-480, Aug. 28, 2012 (5 pages).
Office Action issued Jun. 6, 2017, in corresponding European Application No. 14778830.1 (5 pages).
Extended European Search Report issued in corresponding European Patent Application No. 17195167.6, dated Jan. 25, 2018 (12 pages).

* cited by examiner

| INDEX | POWER LEVEL | MODULATION |
|---|---|---|
| 0 | P1 | M1 |
| 1 | P1 | M2 |
| 2 | P1 | M3 |
| 3 | P2 | M1 |
| 4 | P2 | M2 |
| 5 | P2 | M3 |
| 6 | P3 | M2 |
| 7 | P3 | M3 |

EXAMPLE:
M1=QPSK
M2=16QAM
M3=64QAM
P1=0.2P
P2=0.5P
P3=0.8P

FIG.8

| INDEX | POWER LEVEL $P_{u1}$ | MODULATION $M_{u1}$ | POWER LEVEL $P_{u2}$ | MODULATION $M_{u2}$ |
|---|---|---|---|---|
| 0 | P1 | M1 | P3 | M1 |
| 1 | P1 | M2 | P3 | M2 |
| 2 | P1 | M2 | P3 | M1 |
| 3 | P1 | M3 | P3 | M2 |
| 4 | P1 | M3 | P3 | M1 |
| 5 | P2 | M1 | P2 | M1 |
| 6 | P2 | M2 | P2 | M2 |
| 7 | P2 | M1 | P2 | M2 |
| 8 | P3 | M2 | P1 | M1 |
| 9 | P3 | M1 | P1 | M2 |
| 10 | P3 | M1 | P1 | M3 |
| 11 | P3 | M2 | P1 | M3 |
| 12 | P3 | M3 | P1 | M3 |

$P_{u1}$: POWER OF USER 1
$M_{u1}$: MODULATION USER 1
$P_{u2}$: POWER OF USER 2
$M_{u2}$: MODULATION USER 2

EXAMPLE:
M1=QPSK
M2=16QAM
M3=64QAM
P1=0.2P
P2=0.5P
P3=0.8P

FIG.9

| INDEX | POWER LEVEL Pu1 | MODULATION Mu1 | MODULATION Mu2 |
|---|---|---|---|
| 0 | P1 | M1 | M1 |
| 1 | P1 | M2 | M2 |
| 2 | P1 | M2 | M1 |
| 3 | P1 | M3 | M2 |
| 4 | P1 | M3 | M1 |
| 5 | P2 | M1 | M1 |
| 6 | P2 | M2 | M2 |
| 7 | P2 | M1 | M2 |
| 8 | P3 | M2 | M1 |
| 9 | P3 | M1 | M2 |
| 10 | P3 | M1 | M3 |
| 11 | P3 | M2 | M3 |
| 12 | P3 | M3 | M3 |

EXAMPLE:
M1=QPSK
M2=16QAM
M3=64QAM
P1=0.2P
P2=0.5P
P3=0.8P

FIG.10

| INDEX | POWER LEVEL | MODULATION | CODING RATE |
|---|---|---|---|
| 0 | P1 | M1 | C1 |
| 1 | P1 | M1 | C2 |
| 2 | P1 | M1 | C3 |
| 3 | P1 | M2 | C1 |
| 4 | P1 | M2 | C2 |
| 5 | P1 | M2 | C3 |
| 6 | P2 | M1 | C1 |
| 7 | P2 | M1 | C2 |
| 8 | P2 | M1 | C3 |
| 9 | P2 | M2 | C1 |
| 10 | P2 | M2 | C2 |
| 11 | P2 | M2 | C3 |
| 12 | P3 | M3 | C1 |
| 13 | P3 | M3 | C2 |
| 14 | P3 | M3 | C3 |
| 15 | P3 | M3 | C3 |

EXAMPLE:
M1=QPSK
M2=16QAM
M3=64QAM
C1=1/2
C2=3/4
C3=4/5
P1=0.2P
P2=0.5P
P3=0.8P

FIG.13

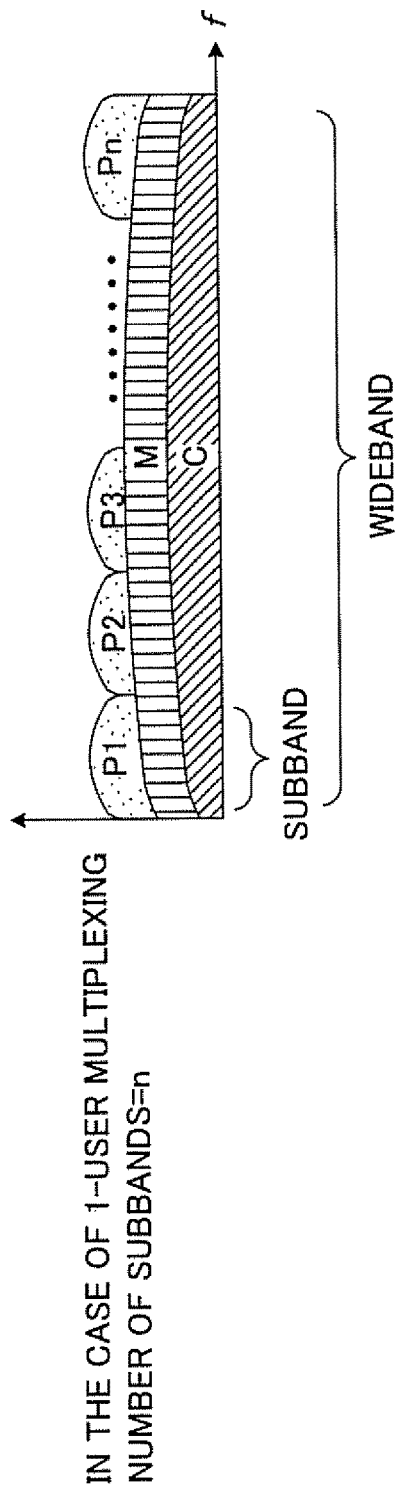
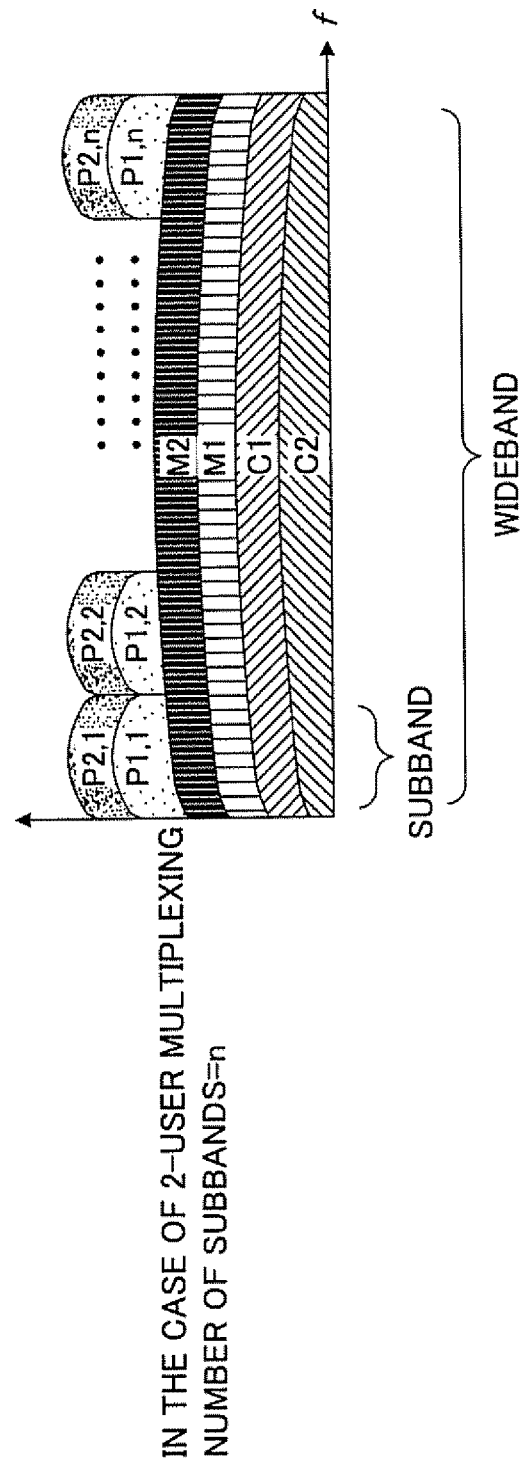

RADIO BASE STATION, USER TERMINAL AND RADIO COMMUNICATION METHOD

TECHNICAL FIELD

The present invention relates to a radio base station, a user terminal and a radio communication method that are suitable for future radio communication systems.

BACKGROUND ART

Conventionally, in radio communication systems, various radio access schemes are used. For example, in UMTS (Universal Mobile Telecommunications System), which is also referred to as "W-CDMA (Wideband Code Division Multiple Access)," code division multiple access (CDMA) is used. Also, in LTE (Long Term Evolution), orthogonal frequency division multiple access (OFDMA) is used (for example, non-patent literature 1).

Also, adaptive modulation and coding (AMC) to adjust at least one of the modulation scheme and the coding rate adaptively, transmission power control to control transmission adaptively, and so on are known as link adaptation in radio communication systems.

CITATION LIST

Non-Patent Literature

Non-Patent Literature 1: 3GPP TR 25.913 "Requirements for Evolved UTRA and Evolved UTRAN" Summary of Invention

Technical Problem

For future radio communication systems referred to as, for example, "FRA (Future Radio Access)," a study is being conducted on the use of non-orthogonal multiple access (NOMA), which is premised upon canceling interference (interference cancellation) on the receiving side, as a downlink radio access scheme.

In non-orthogonal multiple access, for example, as illustrated in FIG. 1, downlink signals for a plurality of user terminals indicating different channel states (represented by, for example, the path loss, the SINR (Signal to Interference plus Noise Ratio), the SNR (Signal to Noise Ratio) and so on) are superposed over the same radio resource allocated by OFDMA, and transmitted with different transmission power. On the receiving side, downlink signals for a desired user terminal are sampled by cancelling downlink signals for other user terminals.

When the above non-orthogonal multiple access (NOMA) is used in future radio communication systems, how to execute link adaptation (for example, adaptive control of modulation and coding schemes (MCS: Modulation and Coding Scheme), transmission power and so on) raises the problem. Also, when orthogonal multiple access (OMA) such as OFDMA is used in future radio communication systems, improvement of link adaptation is expected.

The present invention has been made in view of the above, and it is therefore an object of the present invention to provide a radio base station, a user terminal and a radio communication method that make possible link adaptation suitable for future radio communication systems.

Solution to Problem

A radio base station, according to the present invention, is a radio base station that multiplexes and transmits downlink data for each of a plurality of user terminals, and has a coding section that encodes the downlink data for each of the plurality of user terminals, a modulation section that modulates the downlink data for each of the plurality of user terminals, and a transmission section that multiplexes the downlink data for each of the plurality of user terminals on a per subband basis, and transmits the downlink data for each of the plurality of user terminals by using transmission power that is allocated to each of the plurality of user terminals on a per subband basis.

Technical Advantage of Invention

According to the present invention, link adaptation that is suitable for future radio communication systems is made possible.

BRIEF DESCRIPTION OF DRAWINGS

FIG. 8 is a diagram to illustrate an example of a MPS table according to the first example;

FIG. 9 is a diagram to illustrate another example of a MPS table according to the first example;

FIG. 10 is a diagram to illustrate yet another example of a MPS table according to the first example;

FIG. 13 is a diagram to illustrate an example of a MCPS table according to the second example;

FIG. 14 provides diagrams to explain adaptive control of transmission power and modulation and coding schemes according to a third example;

DESCRIPTION OF EMBODIMENTS

Figure 1:
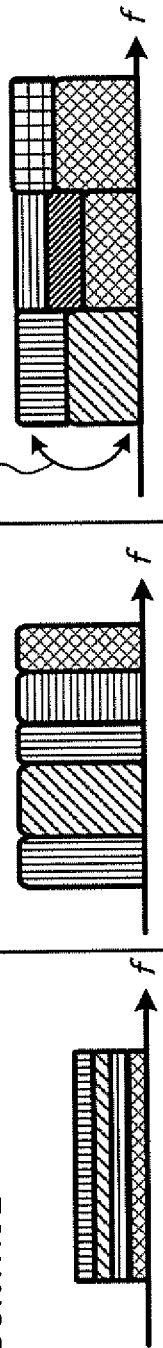
FIG. 1 is a diagram to explain radio access schemes used in various radio communication systems.
Figure 2:
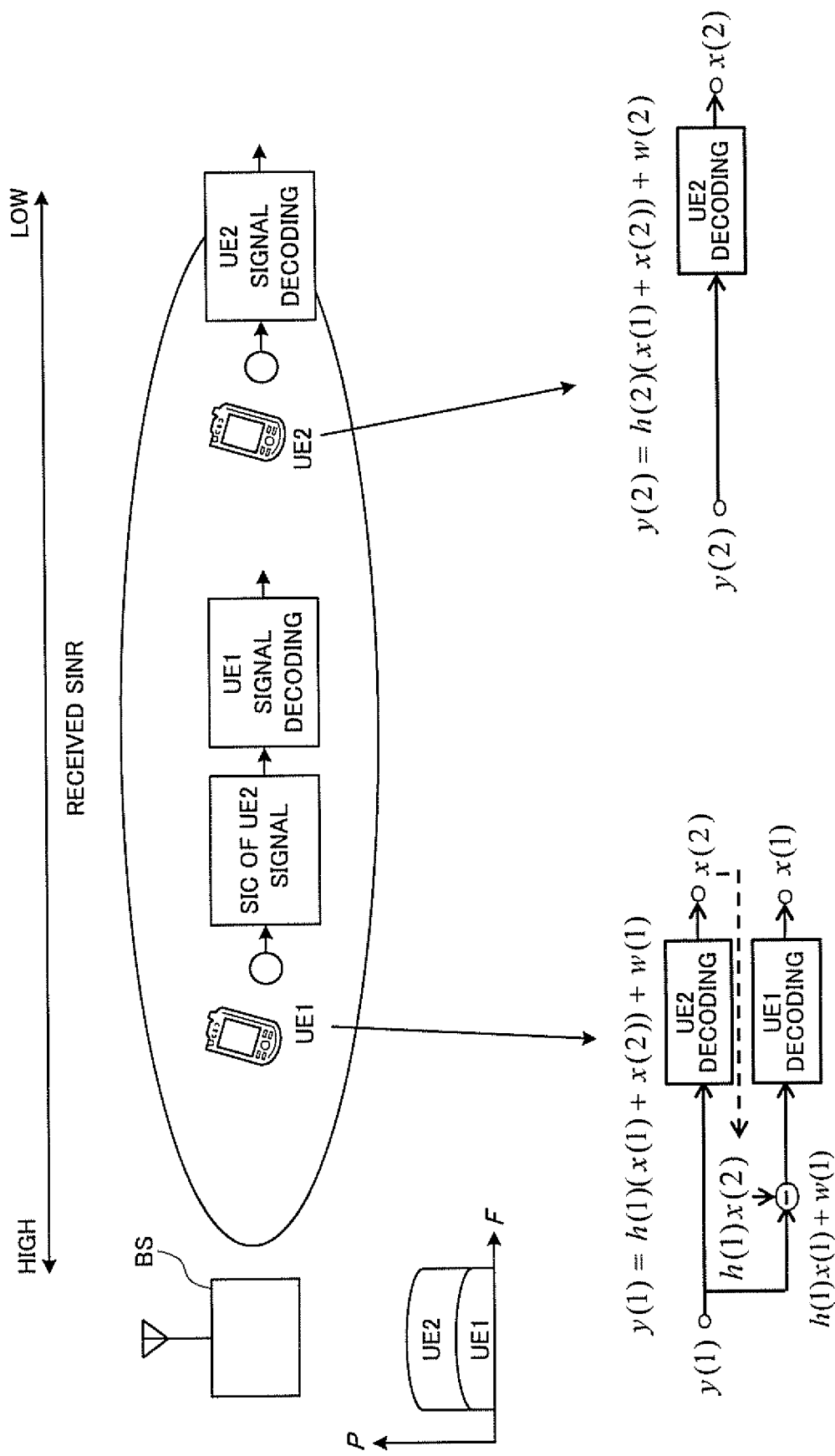
FIG. 2 is a diagram to explain non-orthogonal multiple access (NOMA)

FIG. 2 is a diagram to explain non-orthogonal multiple access (NOMA) on the downlink. FIG. 2 illustrates a case where a user terminal UE 1 is located in a central part of a cell (hereinafter referred to as a "cell center part") formed by a radio base station BS, and a user terminal UE 2 is located in an edge part of this cell (hereinafter referred to as a "cell edge part"). The path loss in the cell increases from the cell center part towards the cell edge parts. Consequently, as illustrated in FIG. 2, the received SINR at the user terminal UE 2 that is located in a cell edge part where the path loss is great is lower than the received SINR at the user terminal UE 1 that is located in the cell center part where the path loss is low.

In non-orthogonal multiple access, a plurality of user terminals UE are multiplexed over the same radio resource by applying varying transmission power depending on differences in channel states (for example, the path loss, the SINR, the SNR, etc.). For example, in FIG. 2, downlink signals for the user terminals UE 1 and UE 2 with varying received SINRs are multiplexed over the same radio resource. Also, the downlink signal for the user terminal UE 1 where the received SINR is high is transmitted with relatively small transmission power, and the downlink signal for the user terminal UE 2 where the received SINR is low is transmitted with relatively large transmission power.

Also, in non-orthogonal multiple access, downlink signals for a subject terminal are sampled by cancelling interference signals from received signals by means of SIC (Successive Interference Cancellation). To be more specific, downlink signals for a subject terminal are sampled by cancelling downlink signals for other user terminals UE where the received SINR is lower than at the subject terminal.

For example, in FIG. 2, the received SINR at the user terminal UE 2 is lower than at the user terminal UE 1, and therefore the downlink signal for the user terminal UE 2 is transmitted with larger transmission power than the downlink signal for the user terminal UE 1. Consequently, although user terminal UE 1 receives the downlink signal for the user terminal UE 2 as an interference signal, this interference signal is adequately cancelled by SIC. As a result of this, the user terminal UE 1 can sample and adequately decode the downlink signal for the subject terminal.

On the other hand, the received SINR at the user terminal UE 1 is higher than at the user terminal UE 2, and therefore the downlink signal for the user terminal UE 1 is transmitted with smaller transmission power than the downlink signal for the user terminal UE 2. Consequently, the user terminal UE 2 can ignore the interference by the downlink signal for the user terminal UE 1, and does not need to cancel the interference by SIC.

In this way, when non-orthogonal multiple access is applied to the downlink, a plurality of user terminals UE 1 and UE 2 with varying received SINRs can be multiplexed over the same radio resource, so that it is possible to improve the spectral efficiency.

Now, channel capacity (also referred to as "communication capacity," "rate" and so on) in orthogonal multiple access and non-orthogonal multiple access will be described with reference to FIG. 3. Note that, similar to FIG. 2, FIG. 3 assumes that a user terminal UE 1 (user 1) is located in a cell center part, and a user terminal UE 2 (user 2) is located in a cell edge part. Also, the SNRs in the user terminals UE 1 and UE 2 are 20 dB and 0 dB, respectively.

Figure 3A:
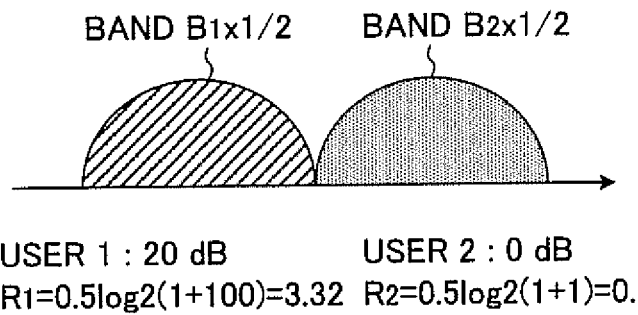
FIG. 3 provides diagrams to explain channel capacity in orthogonal multiple access (OMA) and non-orthogonal multiple access (NOMA)

As illustrated in FIG. 3A, in orthogonal multiple access, orthogonal (different) bands $B_1$ and $B_2$ are evenly allocated to the user terminals UE 1 and UE 2 (users 1 and 2). Also, downlink signals for the user terminals UE 1 and UE 2 are transmitted with fixed transmission power $S_1$ and $S_2$. In this case, the channel capacities $R_1$ and $R_2$ of the user terminals UE 1 and UE 2 are calculated based on $$R_u = B_u \log_2\left(1 + \frac{S_u}{N}\right), \quad [1]$$

and are, for example, 3.32 bps/Hz and 0.50 bps/Hz.

Figure 3B:
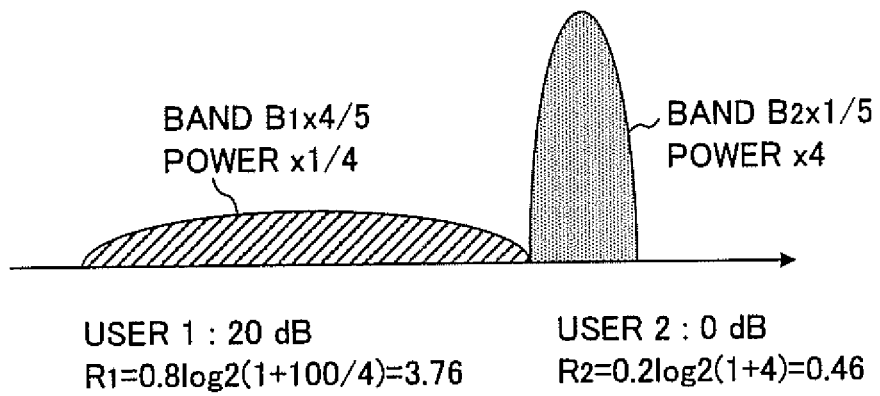

Also, as illustrated in FIG. 3B, in specific transmission modes (for example, TM9 of Release 10) in orthogonal multiple access, transmission power control can be executed. To be more specific, a wider bandwidth is allocated to the user terminal UE 1 in the cell center part, so that downlink signals for the user terminal UE 2 in a cell edge part are transmitted with a higher transmission density.

In the case illustrated in FIG. 3B, the channel capacities $R_1$ and $R_2$ of the user terminals UE 1 and UE 2 are calculated based on equation 1, and are, for example, 3.76 bps/Hz and 0.46 bps/Hz. In this way, when transmission power control is executed in orthogonal multiple access, there is, for example, an advantage that the channel capacity $R_1$ of the user terminal UE 1 in the cell center part improves. Meanwhile, since the dynamic range of power control is limited, the channel capacity $R_1$ of the user terminal UE 2 in a cell edge part does not necessarily improve.

Figure 3C:
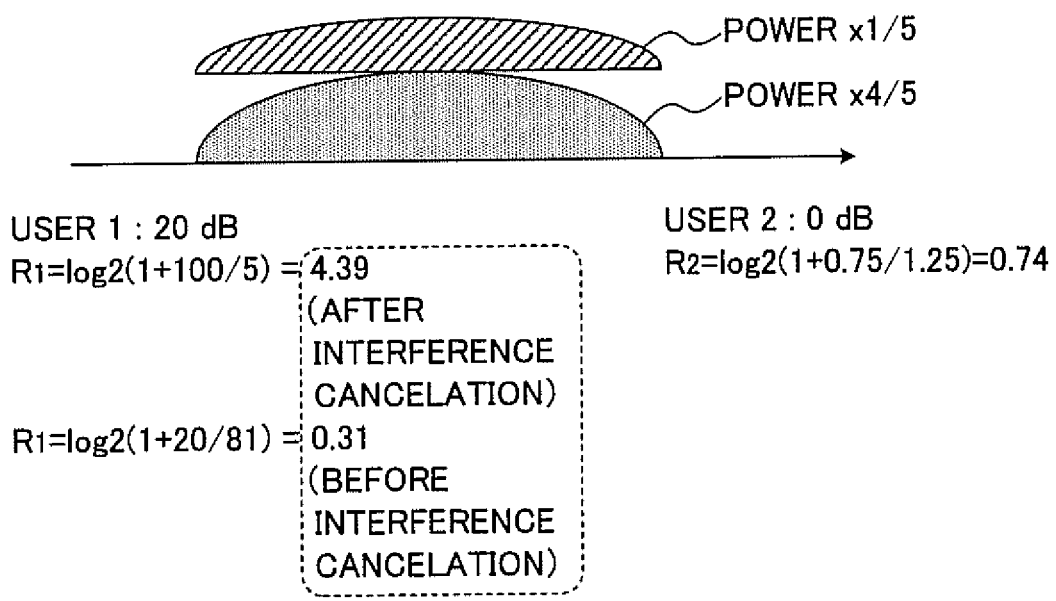

On the other hand, as illustrated in FIG. 3C, in non-orthogonal multiple access, bands $B_1$ and $B_2$ that are not orthogonal (which are the same), are allocated to the user terminals UE 1 and UE 2 (user 1 and 2). Also, downlink signals for the user terminals UE 1 and UE 2 are transmitted by transmission power $S_1$ and $S_2$ that are controlled based on channel states.

In the case illustrated in FIG. 3C, the channel capacity $R_1$ of the user terminal UE 1 in the cell center part is, for example, 0.31 bps/Hz before the interference cancellation (SIC) of the user terminal UE 2, but improves to 4.39 bps/Hz after the interference cancellation (SIC). Also, the channel capacity $R_2$ of the user terminal UE 2 in a cell edge part is 0.74 bps/Hz. In non-orthogonal multiple access, compared to the orthogonal multiple access illustrated in FIG. 3A, the channel capacities $R_1$ and $R_2$ of both user terminals UE 1 and UE 2 are expected to improve.

In transmission power control in non-orthogonal multiple access such as this, for example, fractional transmission power control (FTPC) is under study for application. In FTPC, the transmission power of each user terminal UE (user terminals UE 1 and UE 2 in FIG. 2) to be allocated to the same radio resource is determined based on, for example, equation 2.

$$P_{k,b} = \frac{P_b}{\sum_{t=1}^{K}(|h_{t,b}|^2/N_{t,b})^{-\alpha}}\left(\frac{|h_{k,b}|^2}{N_{k,b}}\right)^{-\alpha} \quad [2]$$

Here, $P_b$ is the total transmission power of the b-th ($1 \le b \le n$) subband. $P_{k,b}$ is the transmission power of the b-th subband of the k-th ($1 \le k \le K$) user terminal UE (user). $h_{k,b}$ is the channel coefficient of the b-th subband of the k-th user terminal UE. $N_{k,b}$ is the sum of the interference from other cells in the b-th subband of the k-th user terminal UE, and noise. Also, $\alpha$ ($0 \le \alpha \le 1$) is a parameter to control system efficiency and fairness. When $\alpha$=0, user terminals UE to be non-orthogonal-multiplexed have equal transmission power, and, when $\alpha \to 1$ user terminals UE with lower channel gain are allocated greater transmission power.

Note that, in equation 2, $$\left(\frac{|h_{k,b}|^2}{N_{k,b}}\right) \quad [3]$$

represents the channel gain in the b-th subband of the k-th user terminal UE.

Also, transmission power control in non-orthogonal multiple access is under study for execution over a wideband or in subbands. FIG. 4 provides conceptual diagrams of transmission power control in non-orthogonal multiple access. Note that FIG. 4 illustrates examples where three user terminals UE are allocated to the same radio resource (K=3).

Figures 4A, 4B:
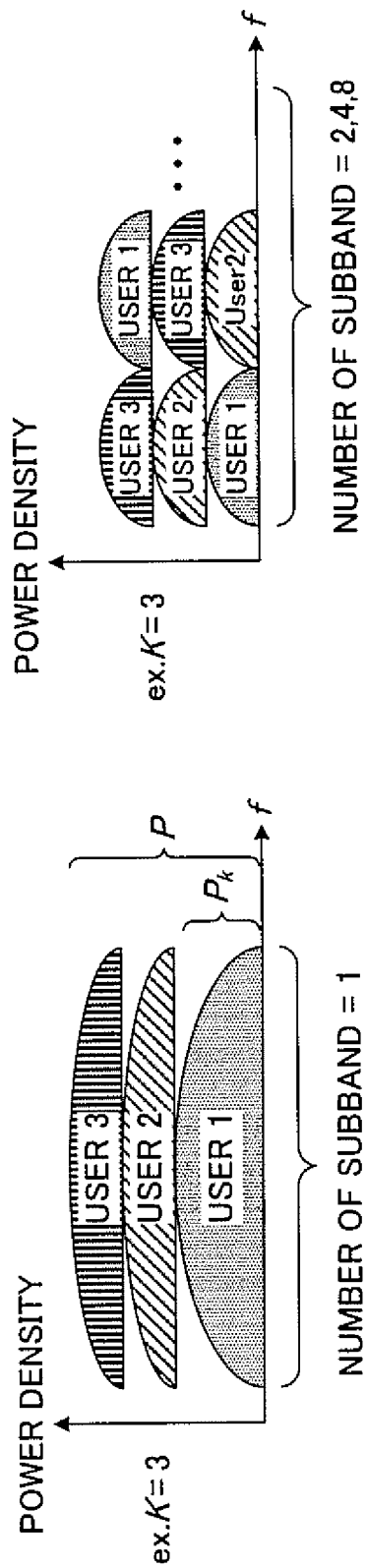
FIG. 4 provides diagrams to explain adaptive control of transmission power in NOMA.

As illustrated in FIG. 4A, when transmission power control is executed over a wideband, the total transmission power P is distributed among the user terminal UE 1 (user 1), the user terminal UE 2 (user 2) and the user terminal UE 3 (user 3). Note that, when the number of subbands n is 1, it may be possible to indicate that transmission power control is executed over a wideband.

On the other hand, as illustrated in FIG. 4B, when transmission power control is executed on a per subband basis, the total transmission power $P_b$ of each subband is distributed among the user terminal UE 1 (user 1), the user terminal UE 2 (user 2) and the user terminal UE 3 (user 3). Note that, although the number of subbands n is, for example, 2, 4 and 8, this is by no means limiting.

Figure 5:
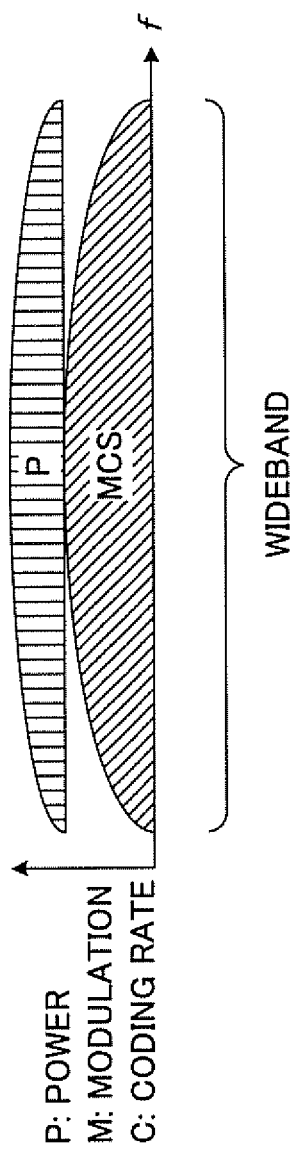
FIG. 5 is a diagram to explain adaptive control of transmission power and modulation and coding schemes in OMA.

Now, in orthogonal multiple access such as LTE and LIE-advanced (LTE-A), as illustrated in FIG. 5, transmission power and modulation and coding schemes (MCS) are controlled over a wideband. The transmission power is controlled semi-statically by reporting the transmission power ratio of reference signals and data signals through RRC signaling. Also, the modulation and coding schemes are included in downlink control information (DCI) of a downlink control channel (PDCCH: Physical Downlink Control Channel), and controlled dynamically.

Meanwhile, a study is in progress to determine a plurality of user terminals UE to non-orthogonal-multiplex per subband when using non-orthogonal multiple access in future radio communication systems such as FRA. In this case, there is a threat that, by only controlling transmission power over a wideband, the interference between the user terminals UE that are non-orthogonal-multiplexed per subband cannot be controlled sufficiently.

Also, when orthogonal multiple access such as OFDMA is used in future radio communication systems such as FRA, a plurality of user terminals UE to orthogonal-multiplex may be likewise determined on a per subband basis. In this case, there is a threat that, by only controlling transmission power over a wideband, the interference between the cells cannot be controlled sufficiently.

In this way, when downlink data for each of a plurality of user terminals UE that are multiplexed (non-orthogonal-multiplexed or orthogonal-multiplexed) per subband is transmitted using transmission power that is controlled over a wideband, there is a threat that the interference between the user terminals UE or the interference between the cells cannot be controlled sufficiently.

So, the present inventors have conceived of making it possible to control interference between a plurality of user terminals UE or interference between cells sufficiently, by making it possible to transmit downlink data for each of a plurality of user terminals UE that are multiplexed (non-orthogonal-multiplexed or orthogonal-multiplexed) per subband, using transmission power that is allocated to each of the plurality of user terminals UE on a per subband basis, and thereupon arrived at the present invention.

With the radio communication method according to the present invention, a radio base station eNB encodes downlink data for each of a plurality of user terminals UE, and modulates the downlink data for each of the plurality of user terminals UE. Also, the radio base station eNB multiplexes (non-orthogonal-multiplexes or orthogonal-multiplexes) downlink data for each of a plurality of user terminals UE on a per subband basis, and transmits the data for each of the plurality of user terminals UE by using transmission power that is allocated to each of the plurality of user terminals UE on a per subband basis Here, a subband refers to a frequency band comprised of a predetermined number of radio resources that are continuous along the frequency direction (for example, resource blocks (RBs) and so on). Also, a wideband, which will be described later, refers to a frequency band comprised of a plurality of subbands. A wideband may be made equal to the system band allocated to the user terminals UE. Also, when carrier aggregation to group a plurality of component carriers (CCs) (for example, maximum five CCs) is executed, a wideband may be made equal to one component carrier.

Also, the number of radio resources to constitute each subband (for example, the number of RBs) (subband size) or the number of subbands to constitute the system band (wideband) can be changed depending on the size of the system band allocated to the user terminals UE.

Note that, although radio communication methods in a radio communication system to use non-orthogonal multiple access (NOMA) will be described below, this is by no means limiting. The radio communication method according to the present invention is applicable not only to radio communication systems to use non-orthogonal multiple access, but also is adequately applicable to radio communication systems to use orthogonal multiple access such as OFDMA. By applying the present invention to systems where orthogonal multiple access is used, it is possible to control interference between cells sufficiently.

First Example

A radio communication method according to a first example will be described with reference to FIGS. 6 to 10. With the radio communication method according to the first example, downlink data for user terminals UE to be non-orthogonal-multiplexed per subband is encoded by coding rates that are determined per wideband. The downlink data encoded in wideband units is modulated by modulation schemes that are determined on a per subband basis. The downlink data modulated on a per subband basis is transmitted by transmission power that is allocated to the user terminals UE on a per subband basis.

FIG. 6 provides diagrams to explain adaptive control of transmission power and modulation and coding schemes according to the first example. Note that, in FIG. 6, the wideband is formed by including n subbands (n≥1). Also, FIG. 6 assumes that m user terminals UE (m≥1) are non-orthogonal-multiplexed in each of then subbands.

Figure 6A:
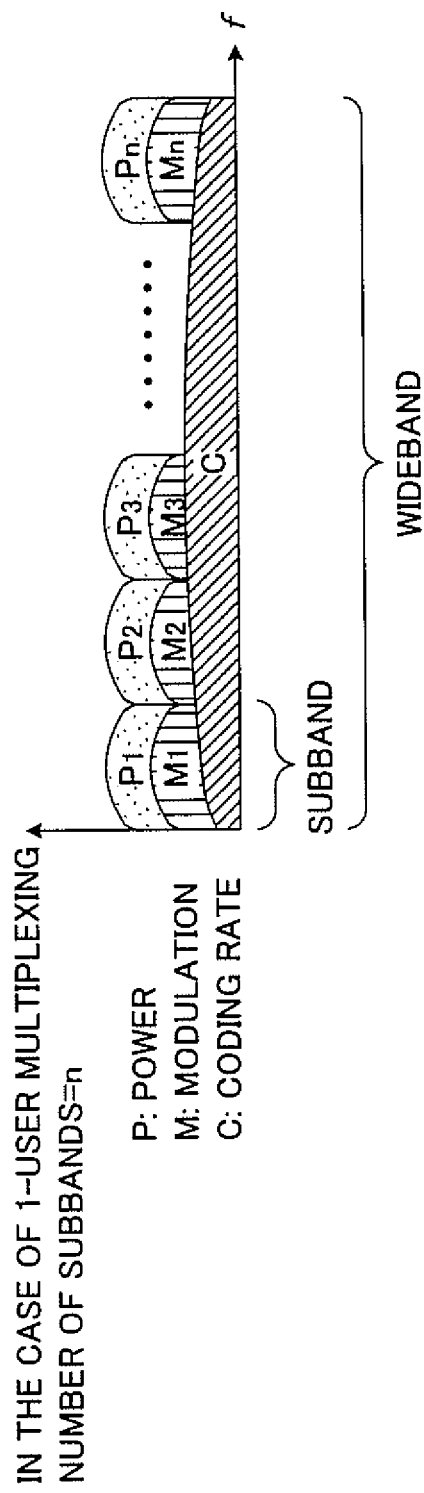
FIG. 6 provides diagrams to explain adaptive control of transmission power and modulation and coding schemes according to a first example.

FIG. 6A illustrates a case where only one user terminal UE is multiplexed in each of the n subbands (m=1). As illustrated in FIG. 6A, downlink data for the user terminals UE is encoded by a coding rate C, which is determined per wideband. The downlink data encoded in wideband units is modulated by modulation schemes $M_b(1 \leq b \leq n)$, which are determined on a per subband basis. The downlink data modulated on a per subband basis is transmitted by transmission power $P_b$ (1≤b≤n), which is allocated on a per subband basis.

Figure 6B:
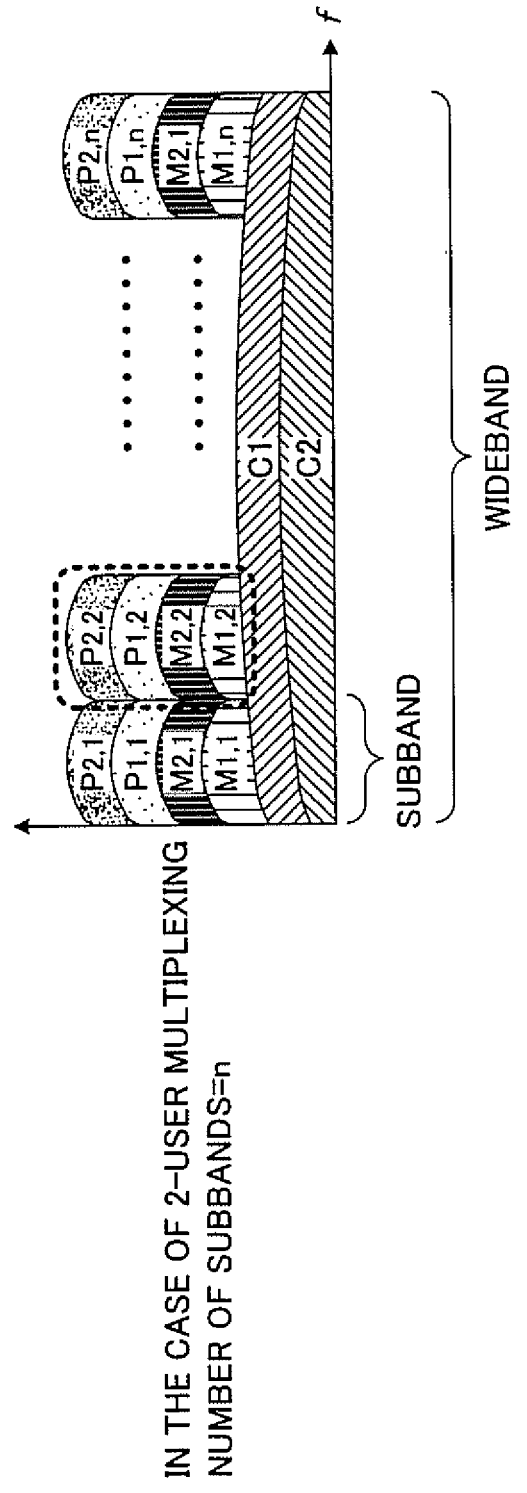

FIG. 6B illustrates case where a plurality of user terminals UE are multiplexed in each of the n subbands (for example, m=2). As illustrated in FIG. 6B, downlink data for the k-th (k=1 or 2 in FIG. 6B) user terminal UE is encoded by a coding rate $C_k$, which is determined per wideband. The encoded downlink data for the k-th user terminal UE is modulated by modulation schemes $M_{k,b}$ (1≤b≤n), which are determined on a per subband basis. The modulated downlink data for the k-th user terminal UE is transmitted by transmission power $P_{k,b}$ (1≤b≤n), which is allocated on a per subband basis.

Figure 7:
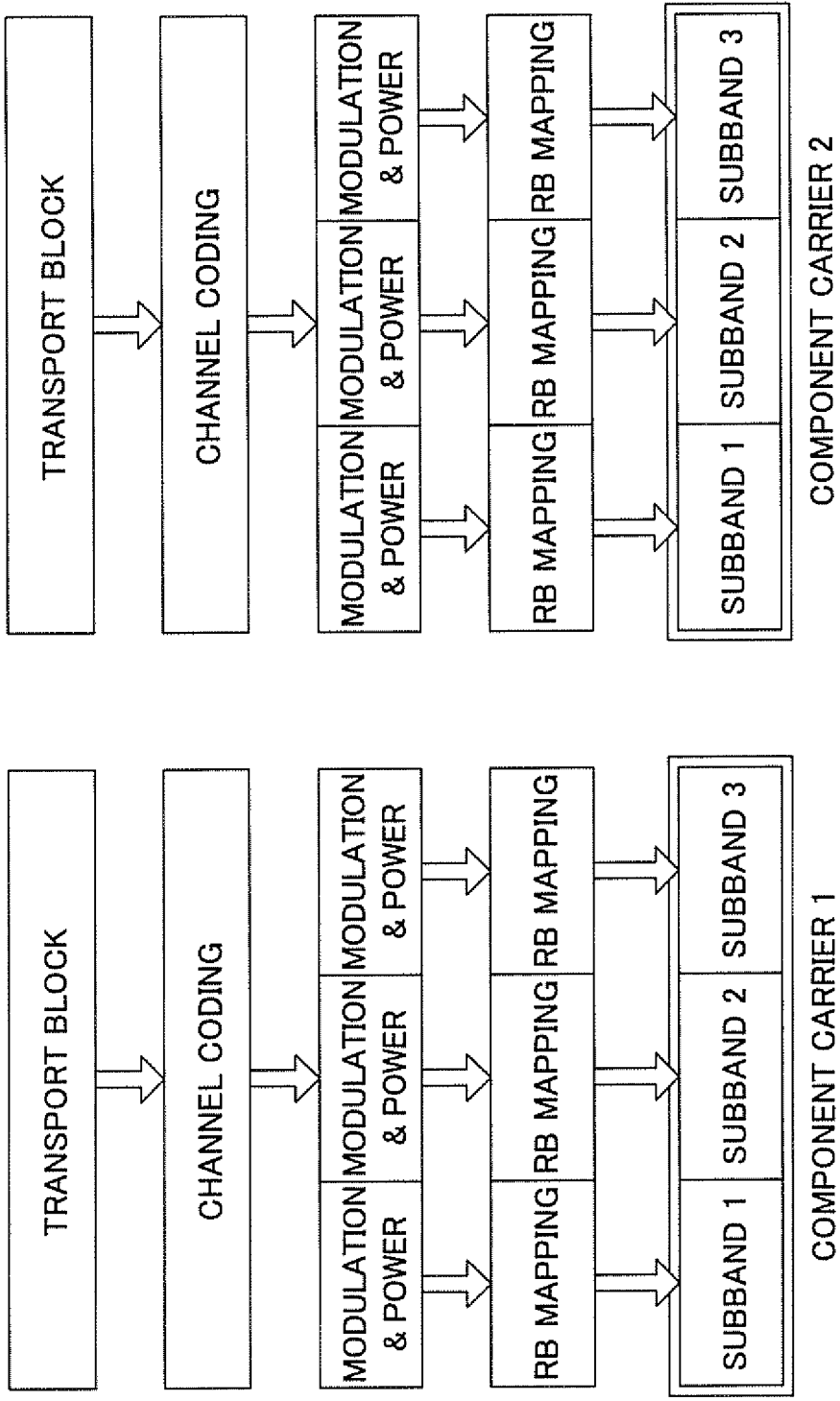
FIG. 7 is a diagram to explain mapping from the MAC layer to the physical layer according to the first example.

FIG. 7 is a diagram to explain mapping from the MAC (Medium Access Control) layer to the physical layer according to the first example. Note that, although FIG. 7 illustrates a case where carrier aggregation to group two CCs is executed, this is by no means limiting. The present invention is adequately applicable to cases where carrier aggregation is not executed, where three or more CCs are grouped, and so on. Also, although FIG. 7 assumes that a wideband is comprised of one CC, a wideband may be comprised of a plurality of CCs as well.

As illustrated in FIG. 7, in the MAC layer, transport blocks, which are the unit of downlink data retransmission control (HARQ: Hybrid-Automatic Repeat reQuest entity), are generated on a per CC basis. Note that up to two transport blocks can be supported per one CC. Transport blocks that are generated are sent from the MAC layer to the physical layer.

In the physical layer, the transport blocks of each CC are encoded by coding rates, which are determined per one CC (wideband). Modulation schemes and transmission power are determined for the encoded downlink data of each CC, on a per subband basis. Also, the downlink data that is modulated by the modulation schemes determined on a per subband basis is mapped to the radio resources (for example, resource blocks) of the corresponding subbands, and transmitted by transmission power that is determined for these subbands.

Also, with the radio communication method according to the first example, coding rates that are determined per wideband may be reported to the user terminals UE dynamically, or may be reported to the user terminals UE semi-statically. In the event of dynamic reporting, the coding rates may be reported by, for example, a downlink control channel (PDCCH, EPDCCH: Enhanced Physical Downlink Control Channel), as downlink control information (DCI). Also, in the event of semi-static reporting, the coding rates may be reported by higher layer signaling via the RRC (Radio Resource Control) layer, the MAC layer and so on.

Also, in the radio communication method according to the first example, the transmission power and modulation schemes that are determined on a per subband basis are reported to the user terminals UE dynamically. Also, the transmission power and modulation schemes that are determined may be reported separately, or may be joint-encoded and reported.

Here, the joint encoding of transmission power and modulation schemes may be carried out for every user terminal UE that is non-orthogonal-multiplexed, or may be carried out collectively for all the user terminals UE that are non-orthogonal-multiplexed. Also, the joint encoding of transmission power and modulation schemes may be carried out on a per subband basis, or may be carried out collectively for all subbands.

Now, the table (hereinafter referred to as "MPS (Modulation, Power Set) table") to use upon joint encoding of transmission power and modulation schemes will be described with reference to FIGS. 8 to 10.

FIG. 8 is a diagram to illustrate an example of a MPS table in the event joint encoding is carried out per user terminal UE that is non-orthogonal-multiplexed. In this case, in the MPS table, combinations (hereinafter referred to as "MPSs (Modulation, Power Sets)") of transmission power ("Power Level") and modulation schemes ("Modulation"), and indices (hereinafter referred to as "MPS indices") to indicate these combinations, are defined.

For example, in FIG. 6A, when the transmission power $P_1$ and modulation scheme $M_1$ of subband 1 are 0.2 P and 16QAM, the MPS index "1," which corresponds to the combination of these transmission power $P_1$ and modulation scheme $M_1$, is selected from the MPS table illustrated in FIG. 8. Similarly, the MPS indices for subbands 2 to n are selected.

The n MPS indices that are selected from the MPS table illustrated in FIG. 8 on a per subband basis are each reported to the user terminals UE through a downlink control channel. With this MPS table illustrated in FIG. 8, it is possible to joint-encode the transmission power and modulation schemes per user terminal UE that is non-orthogonal-multiplexed, and per subband, and report these to the user terminals UE.

Note that, although the MPS indices are three bits and eight MPSs are defined in the MPS table illustrated in FIG. 8, this is by no means limiting. The number of MPSs to define in the MPS table may be increased or decreased depending the number of bits of these MPS indices.

Also, although not illustrated, it is equally possible to define combinations of the transmission power $P_1$ to $P_n$ and the modulation schemes $M_1$ to $M_n$ of all subbands, and indices to indicate these combinations, in the MPS table illustrated in FIG. 8. An MPS index that is selected from this MPS table may be reported to the user terminals UE through a downlink control channel. With this MPS table, it is possible to collectively joint-encode the transmission power and modulation schemes of all subbands, per user terminal UE that is non-orthogonal-multiplexed, and report these to the user terminals UE.

FIG. 9 is a diagram to illustrate an example of a MPS table in the event all of the user terminals UE to be non-orthogonal-multiplexed are joint-encoded collectively. In this case, in the MPS table, combinations (hereinafter referred to as "MPSs") of the transmission power ("Power Level") and modulation schemes ("Modulation") for a plurality of user terminals UE, and indices (hereinafter referred to as "MPS indices") to indicate these combinations, are defined.

For example, when two user terminals UE 1 and UE 2 are non-orthogonal-multiplexed, as illustrated in FIG. 9, combinations of the transmission power for the user terminal UE 1 (Power level Pu1), the modulation scheme for the user terminal UE 1 (Modulation Mu1), the transmission power for the user terminal UE 2 (Power level Pu2) and the modulation scheme for the user terminal UE 2 (Modulation Mu2), and MCS indices to indicate these combinations, are defined.

Here, FIG. 6B assumes that the transmission power $P_{1,1}$ and the modulation scheme $M_{1,1}$ of the user terminal UE 1 (user 1) in subband 1 are 0.2 P and 16QAM, and the transmission power $P_{2,1}$ and the modulation scheme $M_{2,1}$ of the user terminal UE 2 (user 2) are 0.8 P and 16QAM, respectively. In this case, the MPS index "1," which corresponds to the combination of the transmission power $P_{1,1}$ and the modulation scheme $M_{1,1}$ of the user terminal UE 1 and the transmission power $P_{2,1}$ and the modulation scheme $M_{2,1}$ of the user terminal UE 2, is selected from the MPS table illustrated in FIG. 9. Similarly, the MPS indices for subbands 2 to n are selected.

The n MPS indices, selected from the MPS table illustrated in FIG. 9 on a per subband basis, are each reported to the user terminals UE through a downlink control channel. With this MPS table illustrated in FIG. 9, it is possible to collectively joint-encode the transmission power and modulation schemes of all user terminals UE that are non-orthogonal-multiplexed, per subband, and report these to the user terminals UE.

Note that, although the MPS indices are four bits and twelve MPSs are defined in the MPS table illustrated in FIG. 9, this is by no means limiting. The number of MPSs to define in the MPS table may be increased or decreased depending on the number of bits of these MPS indices.

Also, although not illustrated, it is equally possible to define combinations of the transmission power $P_{1,1}$ to $P_{m,n}$ and the modulation schemes $M_{1,1}$ to $M_{m,n}$ of all subbands of a plurality of user terminals UE, and indices to indicate these combinations, in the MPS table illustrated in FIG. 9. An MPS index that is selected from this MPS table may be reported to the user terminals UE through a downlink control channel. With this MPS table, it is possible to collectively joint-encode the transmission power and modulation schemes of all the user terminals UE that are non-orthogonal-multiplexed, for all subbands, and report these to the user terminals UE.

FIG. 10 is a diagram to illustrate another example of a MPS table in the event all the user terminals UE that are non-orthogonal-multiplexed are joint-encoded collectively. As illustrated in FIG. 10, when two user terminals UE 1 and UE 2 are non-orthogonal-multiplexed, combinations of the transmission power $P_1$ (Power level Pu1) of one user terminal UE 1 and the modulation schemes $M_1$ and $M_2$ (Modulation Mu1 and Modulation Mu2) of both user terminals UE 1 and UE 2, and indices (hereinafter referred to as "MPS indices") to indicate these combinations, are defined.

n MPS indices that are selected from the MPS table illustrated in FIG. 10 on a per subband basis are each reported to the user terminals UE 1 and UE 2 through a downlink control channel. Also, the total transmission power P of each of the n subbands is reported to the user terminals UE 1 and UE 2 through higher layer signaling via the RRC layer and the MAC layer. The user terminal UE 1 can calculate the transmission power $P_2$ of the user terminal UE 2 by subtracting the transmission power $P_1$ of the user terminal UE 1 indicated by the MPS index from the total transmission power P of each subband.

Note that, even when the total transmission power P is subject to dynamic control, the user terminal UE 1 can calculate the transmission power $P_2$ of the user terminal UE 2 by subtracting the transmission power $P_1$ of the user terminal UE 1 indicated by the MPS index from the total transmission power P of each subband reported through a downlink control channel (for example, the PDCCH). By allowing the user terminal UE 1 to learn the transmission power allocated to the user terminal UE 1 and the user terminal UE 2, it may be possible to determine the order of decoding as appropriate.

With the MPS table illustrated in FIG. 10, it is possible to reduce the amount of information to joint-encode in one MPS index compared to the MPS table illustrated in FIG. 9.

Note that, although the MPS indices are four bits and twelve MPSs are defined in the MPS table illustrated in FIG. 10, this is by no means limiting. The number of MPSs to define in the MPS table may be increased or decreased depending on the number of bits of these MPS indices. Also, although not illustrated, it is equally possible to define combinations of all subbands and indices to indicate these combinations.

With the above radio communication method according to the first example, the transmission power and modulation schemes of downlink data for user terminals UE to be non-orthogonal-multiplexed per subband are determined on a per subband basis, while the coding rate of this downlink data is determined per wideband. Consequently, it is possible to prevent the increase of overhead while controlling interference between user terminals UE that are non-orthogonal-multiplexed per subband, and achieve gain by the non-orthogonal-multiplexing.

Second Example

A radio communication method according to a second example will be described with reference to FIGS. 11 to 13. With the radio communication method according to the second example, downlink data for user terminals UE to be non-orthogonal-multiplexed per subband is encoded by coding rates that are determined on a per subband basis. The downlink data encoded on a per subband basis is modulated by modulation schemes that are determined on a per subband basis. The downlink data modulated on a per subband basis is transmitted with transmission power that is allocated to the user terminals UE on a per subband basis.

FIG. 11 provides diagrams to explain adaptive control of transmission power and modulation and coding schemes according to the second example. Note that, in FIG. 11, the wideband is formed by including n subbands (n≥1). Also, FIG. 11 assumes that m user terminals UE (m≥1) are non-orthogonal-multiplexed in each of the n subbands.

Figure 11A:
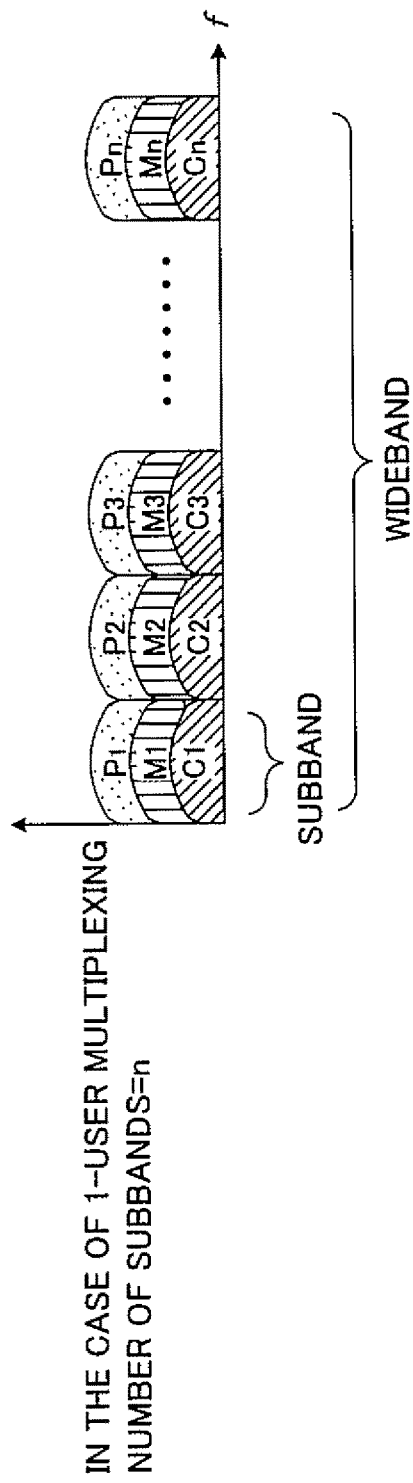
FIG. 11 provides diagrams to explain adaptive control of transmission power and modulation and coding schemes according to a second example.

FIG. 11A illustrates a case where only one user terminal UE is multiplexed in each of the n subbands (m=1). As illustrated in FIG. 11A, downlink data for the user terminals UE is encoded by coding rates $C_b$ (1≤b≤n), which are determined on a per subband basis. The downlink data encoded in subband units is modulated by modulation schemes Mb (1≤b≤n), which are determined on a per subband basis. The downlink data modulated on a per subband basis is transmitted by transmission power $P_b$ (1≤b≤n), which is allocated on a per subband basis.

Figure 11B:
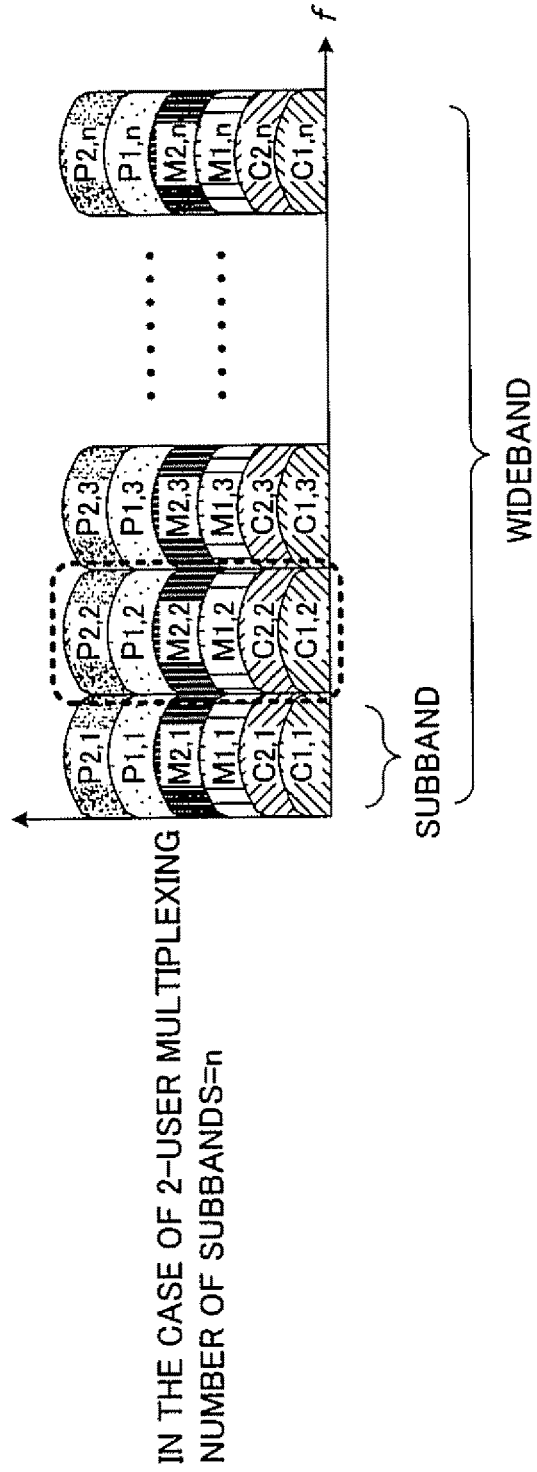

FIG. 11B illustrates a case where a plurality of user terminals UE are multiplexed in each of the n subbands (m=2). As illustrated in FIG. 11B, downlink data for the k-th (k=1 or 2 in FIG. 11B) user terminal UE is encoded by coding rates $C_{k,b}$ (1≤b≤n), which are determined on a per subband basis. The encoded downlink data for the k-th user terminal UE is modulated by modulation schemes $M_{k,b}$ (1≤b≤n), which are determined on a per subband basis. The modulated downlink data for the k-th user terminal UE is transmitted by transmission power $P_{k,b}$(1≤b≤n), which is allocated on a per subband basis.

Figure 12:
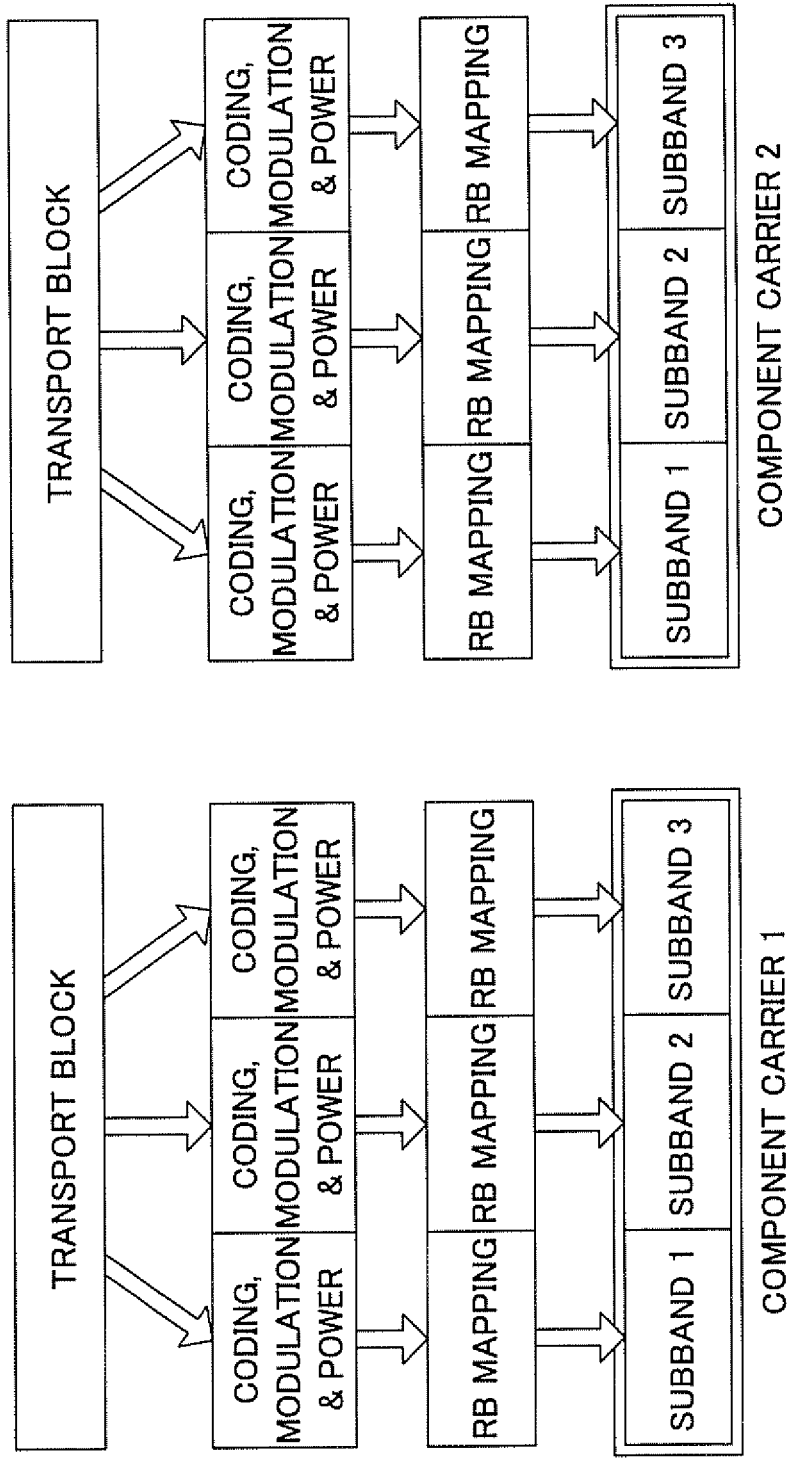
FIG. 12 is a diagram to explain mapping from the MAC layer to the physical layer according to the second example.

FIG. 12 is a diagram to explain mapping from the MAC layer to the physical layer according to the second example. Note that parts in FIG. 12 that are the same as in FIG. 7 will not be described again, and differences from FIG. 7 will be primarily described. As illustrated in FIG. 12, in the MAC layer, transport blocks, which are the unit of downlink data retransmission control (HARQ entity), are generate on a per CC basis.

In the physical layer according to the second example, the coding rate, modulation scheme and transmission power of the transport block of each CC are determined on a per subband basis. The transport block of each CC is encoded by coding rates that are determined on a per subband basis. The encoded downlink data is modulated by modulation schemes that are determined for the corresponding subbands. The modulated downlink data is allocated to the radio resources (for example, resource blocks) of the corresponding subbands, and transmitted by transmission power that is determined for these subbands.

Also, with the radio communication method according to the second example, transmission power, modulation schemes and coding rates that are determined on a per subband basis are reported to the user terminals UE dynamically. The transmission power, modulation schemes and coding rates may be reported separately, or may be joint-encoded and reported.

Here, the joint encoding of transmission power, modulation schemes and coding rates may be carried out for every user terminal UE that is non-orthogonal-multiplexed, or may be carried out collectively for all of the user terminals UE that are non-orthogonal-multiplexed. Also, the joint encoding of transmission power, modulation schemes and coding rates may be carried out on a per subband basis, or may be carried out collectively for all subbands.

Now, the table (hereinafter referred to as "MCPS (Modulation, Coding, Power Set) table") to use upon joint encoding of transmission power, modulation schemes and coding rates will be described with reference to FIG. 13.

FIG. 13 is a diagram to illustrate an example of a MCPS table in the event joint encoding is carried out per user terminal UE that is non-orthogonal-multiplexed. In this case, in the MCPS table, combinations (hereinafter referred to as "MCPSs (Modulation, Coding, Power Sets)") of transmission power ("Power Level"), modulation schemes ("Modulation") and coding rates ("Coding Rates"), and indices (hereinafter referred to as "MCPS indices") to indicate these combinations, are defined.

For example, when, in FIG. 11A, the transmission power $P_1$, the modulation scheme $M_1$ and the coding rate $C_1$ of subband 1 are 0.2 P, QPSK and ¾, the MCPS index "1," which corresponds to the combination of these transmission power $P_1$, modulation scheme $M_1$ and coding rate $C_1$, is selected from the MCPS table illustrated in FIG. 13. Similarly, the MPS indices for subbands 2 to n are selected.

The n MCPS indices that are selected from the MCPS table illustrated in FIG. 13 on a per subband basis are each reported to the user terminals UE through a downlink control channel. With this MCPS table illustrated in FIG. 13, it is possible to joint-encode the transmission power, modulation schemes and coding rates, per user terminal UE that is non-orthogonal-multiplexed, and per subband, and report these to the user terminals UE.

Note that, although the MCPS indices are four bits and fifteen MCPSs are defined in the MCPS table illustrated in FIG. 13, this is by no means limiting. The number of MCPSs to define in the MCPS table may be increased or decreased depending the number of bits of these MCPS indices.

Also, although not illustrated, it is equally possible to define combinations of the transmission power $P_1$ to $P_n$, the modulation schemes $M_1$ to $M_n$ and the coding rates $C_1$ to $C_n$ of all subbands, and indices to indicate these combinations, in the MCPS table illustrated in FIG. 13. An MCPS index that is selected from this MCPS table may be reported to the user terminals UE through a downlink control channel. With this MCPS table, it is possible to collectively joint-encode the transmission power, modulation schemes and coding rates of all subbands, per user terminal UE that is non-orthogonal-multiplexed, and report these to the user terminals UE.

Furthermore, although not illustrated, similar to FIG. 9, it is also possible to define combinations (hereinafter referred to as "MCPSs") of the transmission power ("Power Level"), modulation schemes ("Modulation") and coding rates ("Coding Rate") of a plurality of user terminals UE, and indices (hereinafter referred to as "MCPS indices") to indicate these combinations, in the MCPS table illustrated in FIG. 13. With this MCPS table, it is possible to collectively joint-encode the transmission power, modulation schemes and coding rates of all the user terminals UE that are non-orthogonal-multiplexed, per subband, and report these to the user terminals UE.

Also, although not illustrated, in the MCPS table illustrated in FIG. 13, similar to FIG. 10, when two user terminals UE 1 and UE 2 are non-orthogonal-multiplexed, combinations of the transmission power $P_1$ of one user terminal UE 1, the modulation schemes $M_1$ and $M_2$ of both user terminals UE 1 and UE and the coding rates $C_1$ and $C_2$ of both user terminals UE 1 and UE 2, and indices (hereinafter referred to as "MCPS indices") to indicate these combinations, may be defined. In this case, if the total transmission power of each subband is reported to the user terminals UE 1 and UE 2, it is possible to skip the joint encoding of the transmission power of the user terminals UE.

With the above radio communication method according to the second example, the transmission power, modulation schemes and coding rates of downlink data for user terminals UE to be non-orthogonal-multiplexed per subband are determined on a per subband basis. Consequently, it is possible to sufficiently control interference between user terminals UE that are non-orthogonal-multiplexed per subband, and achieve significant gain by the non-orthogonal-multiplexing.

Third Example

A radio communication method according to a third example will be described with reference to FIGS. 14 and 15. With the radio communication method according to the third example, downlink data for user terminals UE to be non-orthogonal-multiplexed per subband is encoded by coding rates that are determined per wideband. The downlink data encoded in wideband units is modulated by modulation schemes that are determined per wideband. The downlink data modulated in wideband units is transmitted with transmission power that is allocated to the user terminals UE on a per subband basis.

FIG. 14 is a diagram to explain adaptive control of transmission power and modulation and coding schemes according to the third example. Note that, in FIG. 14, the wideband is formed by including n (n≥1) subbands. Also, FIG. 14 assumes that, in m (m≥1) user terminals UE are non-orthogonal-multiplexed in each of the n subbands.

FIG. 14A illustrates a case where only one user terminal UE is multiplexed in each of the n subbands (m=1). As illustrated in FIG. 14A, downlink data for the user terminals UE is encoded by a coding rate C, which is determined per wideband. Downlink data encoded in wideband units is modulated by a modulation scheme M, which is determined per wideband. The downlink data modulated in wideband units is transmitted by transmission power $P_b$ (1≤b≤n), which is allocated on a per subband basis.

FIG. 14B illustrates a case where a plurality of user terminals UE are multiplexed in each of the n subbands (m=2). As illustrated in FIG. 14B, downlink data for the k-th (k=1 or 2 in FIG. 14B) user terminals UE is encoded by a coding rate $C_k$, which is determined per wideband. The encoded downlink data for the k-th user terminal UE is modulated by a modulation scheme $M_k$, which is determined per wideband. The modulated downlink data for the k-th user terminal UE is transmitted by transmission power $P_{k,b}$ ($1 \le b \le n$), which is allocated on a per subband basis.

Figure 15:
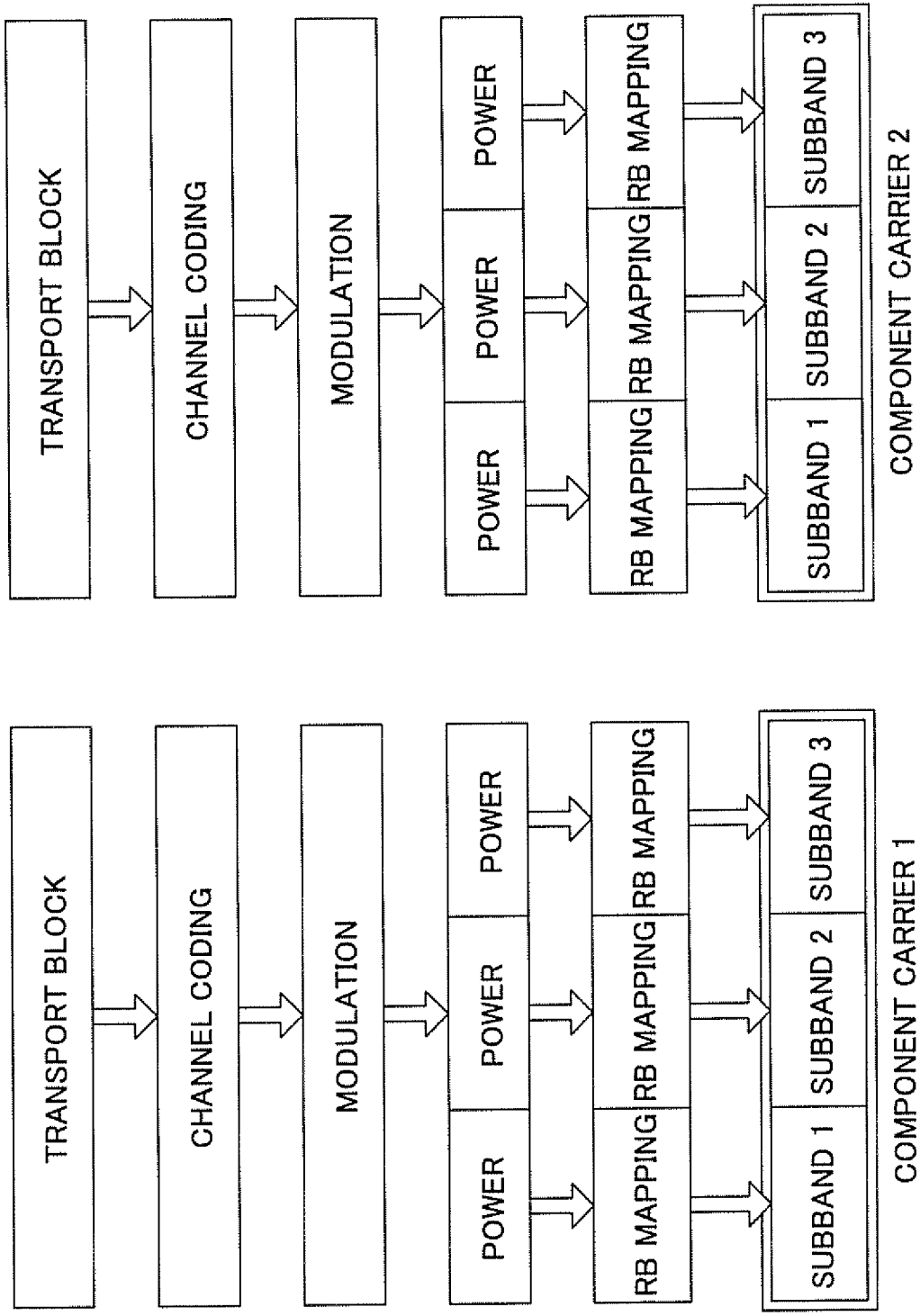
FIG. 15 is a diagram to explain mapping from the MAC layer to the physical layer according to the third example.

FIG. 15 is a diagram to explain mapping from the MAC layer to the physical layer according to the third example. Note that parts in FIG. 15 that are the same as in FIG. 7 will not be described again, and differences from FIG. 7 will be primarily described. As illustrated in FIG. 15, in the MAC layer, transport blocks, which are the unit of downlink data retransmission control (HARQ entity), are generate on a per CC basis.

In the physical layer according to the third example, the transport block of each CC is encoded by a coding rate that is determined per one CC (wideband). The encoded downlink data is modulated by a modulation scheme that is determined per one CC (wideband). The modulated downlink data is mapped to radio resources (for example, resource blocks) per subband, and transmitted by transmission power that is determined on a per subband basis.

Also, with the radio communication method according to the third example, the modulation schemes and coding rates, which are determined per wideband, may be reported to the user terminals UE dynamically, or may be reported to the user terminals UE semi-statically. Also, with the radio communication method according to the third example, the modulation schemes and coding rates determined per wideband may be reported to the user terminals UE dynamically, or may be reported to the user terminals UE semi-statically. Also, in the event of semi-static reporting, the modulation schemes and coding rates may be reported through higher layer signaling via the RRC layer and the MAC layer.

Also, with the radio communication method according to the third example, the transmission power that is determined on a per subband basis is reported to the user terminals UE dynamically. The transmission power of each subband may be reported separately per subband, or may be joint-encoded collectively for all subbands. Here, the joint encoding of all subbands' transmission power may be carried out for every user terminal UE that is non-orthogonal-multiplexed, or may be carried out collectively for all the user terminals UE that are non-orthogonal-multiplexed.

With the above radio communication method according to the third example, the transmission power of downlink data for user terminals UE to be non-orthogonal-multiplexed per subband is determined on a per subband basis. Consequently, it is possible to control interference between user terminals UE that are non-orthogonal-multiplexed per subband.

(Structure of Radio Communication System)

Now, a structure of a radio communication system according to the present embodiment will be described. In this radio communication system, the radio communication methods according to the above first to third examples are employed. A schematic structure of a radio communication system according to the present embodiment will be described with reference to FIG. 16 and FIG. 17.

Figure 16:
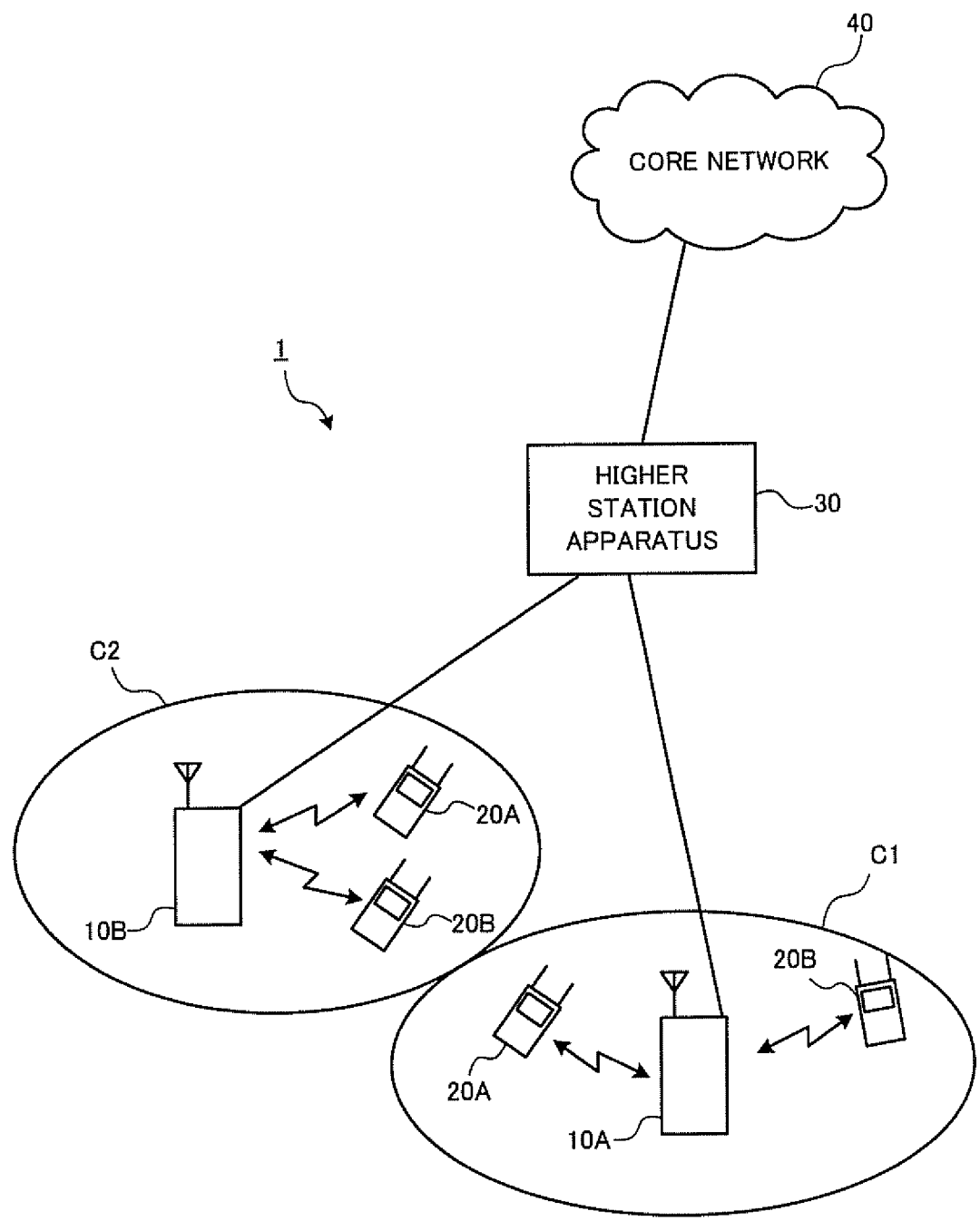
FIG. 16 is a structure diagram of a radio communication system according to the present embodiment.

As illustrated in FIG. 16, a radio communication system 1 includes radio base stations 10 (10A and 10B) and a plurality of user terminals 20 (20A and 20B). The radio base stations 10 are connected with a higher station apparatus 30, and this higher station apparatus 30 is connected with a core network 40. Each user terminal 20 can communicate with the radio base stations 10 in cells C1 and C2.

In the radio communication system 1, the radio base stations 10 may be eNodeBs (eNBs) that form (macro) cells, or may be either RRHs (Remote Radio Heads), eNodeBs (eNBs), femto base stations and pico base stations that form (small) cells. Also, the user terminals 20 may be mobile terminals or fixed terminals. Note that the higher station apparatus 30 may be, for example, an access gateway apparatus, a radio network controller (RNC), a mobility management entity (MME) and so on, but is by no means limited to these.

In the radio communication system 1, non-orthogonal multiple access (NOMA) is applied to the downlink as a radio access scheme. In non-orthogonal multiple access, a plurality of user terminals UE indicating different channel states (SINRs, SNRs, path losses, etc.) are multiplexed over the same radio resource, and downlink data for these plurality of user terminals UE is transmitted with different transmission power. Note that, although these plurality of user terminals UE are non-orthogonal-multiplexed per subband, this is by no means limiting. Also, in the radio communication system 1, it is equally possible to apply orthogonal multiple access such as OFDMA to the downlink.

Also, in the radio communication system 1, a downlink shared channel (PDSCH), which is used by each user terminal 20 on a shared basis, a downlink control channel (PDCCH), an enhanced downlink control channel (EPDCCH), a PCFICH, a PHICH, a broadcast channel (PBCH) and so on are used as downlink communication channels. Downlink data (including user data and higher layer control information) is transmitted by the PDSCH. Downlink control information (DCI) is transmitted by the PDCCH and the EPDCCH.

Also, in the radio communication system 1, an uplink shared channel (PUSCH) that is used by each user terminal 20 on a shared basis, a physical uplink control channel (PUCCH and EPDCCH), a random access channel (PRACH) and so on are used as uplink communication channels. Uplink data (including user data and higher layer control information) is transmitted by the PUSCH. Also, downlink channel state information (described later), delivery acknowledgment information (ACK/NACK) and so on are transmitted by the PUCCH or the PUSCH.

Also, in the radio communication system 1, cell-specific reference signals (CRSs), terminal-specific reference signals that are associated with the PDSCH (also referred to as "UE-specific reference signals," "DM-RSs" and so on), demodulation reference signals (DM-RSs) that are associated with the EPDCCH, channel state measurement reference signals (CSI-RSs) and so on are used as downlink reference signals.

Next, detailed structures of a radio base station 10 and a user terminal 20 will be explained with reference to FIG. 17. Note that, although FIG. 17 illustrates only part of the structures, the radio base station 10 and the user terminal 20 have components that are required, without shortage.

Figure 17:
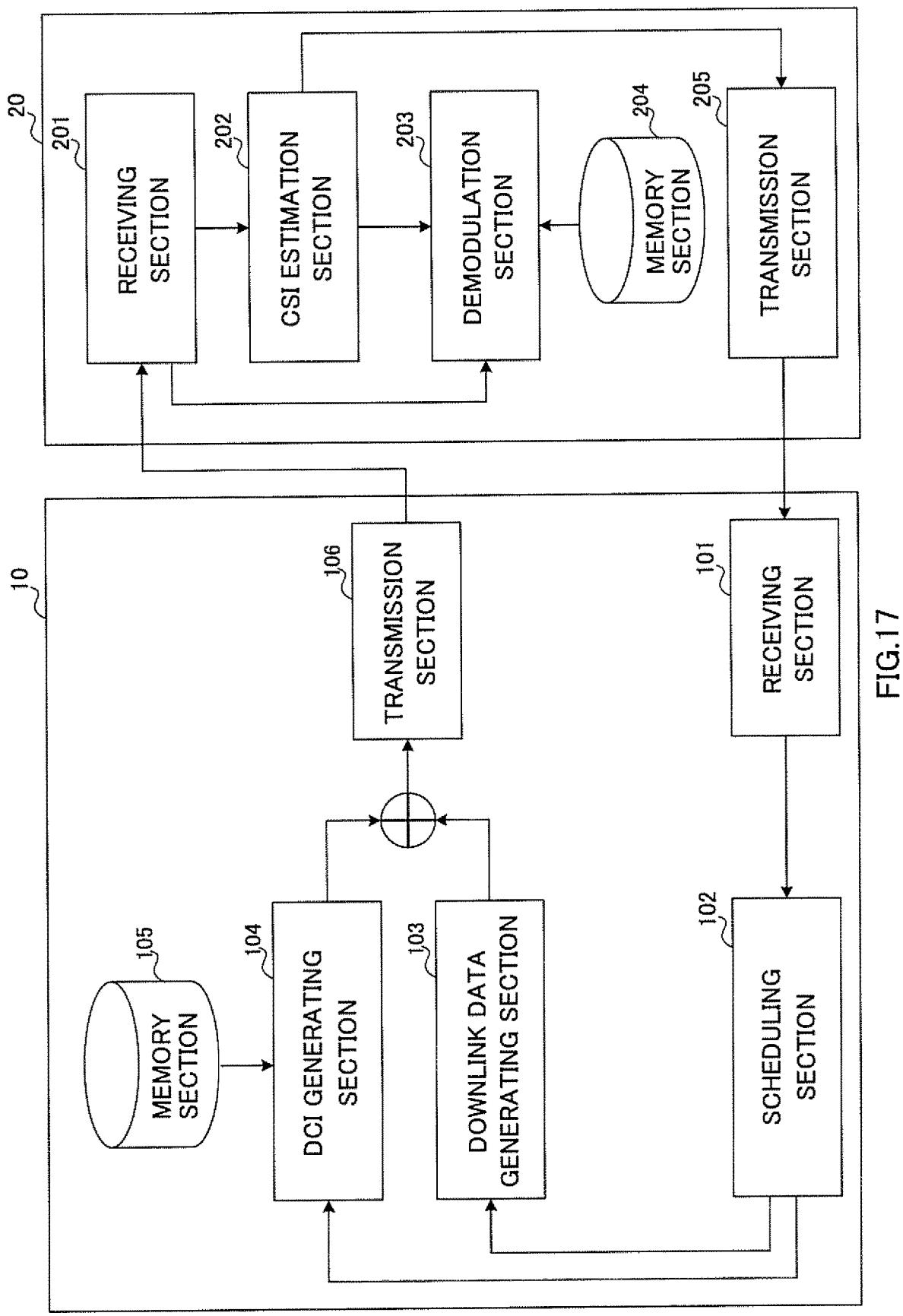
FIG. 17 is a structure diagram of a radio base station and a user terminal according to the present embodiment.

As illustrated in FIG. 17, the radio base station 10 has a receiving section 101, a scheduling section 102, a downlink data generating section 103, a downlink control information (DCI) generating section 104, a memory section 105 and a transmission section 106.

The receiving section 101 receives uplink data and uplink control information. To be more specific, the receiving section 104 receives channel state information (CSI) that is fed back from the user terminals UE. Here, the channel state information refers to information that represents downlink channel states, and may be, for example, CQI (Channel Quality Indicator), SINR, SNR, RSRP (Reference Signal Received Power), RSSI (Reference Signal Strength indicator), RSRQ (Reference Signal Received Quality) and so on.

Also, the channel state information may be information to represent channel states per subband, may be information to represent channel states per wideband, which includes a plurality of subbands, or may be information to represent both channel states. The channel state information per subband includes, for example, subband CQIs, and the SINR, the SNR, the RSRP, the RSSI and the RSRQ of each subband, and so on. Also, the channel state information of a wideband includes the CQI of the wideband, the SINR, the SNR, the RSRP, the RSSI and the RSRQ of the wideband, and so on.

The scheduling section 102 performs scheduling based on the channel state information from the user terminals 20. To be more specific, the scheduling section 102 determines a plurality of user terminals 20 to non-orthogonal-multiplex per subband, based on the channel state information from the user terminals 20. Also, the scheduling section 102 allocates transmission power to each of the user terminals 20 that are non-orthogonal-multiplexed per subband.

Also, the scheduling section 102 determines the coding rate of downlink data based on the channel state information from the user terminals 20. To be more specific, the scheduling section 102 may determine the coding rate of downlink data for the user terminals 20 to non-orthogonal-multiplex, per wideband (the first example and the third example). Alternatively, the scheduling section 102 may determine the coding rate of the downlink data for the user terminals 20 to non-orthogonal-multiplex, on a per subband basis (the second example).

Also, the scheduling section 102 determines the modulation scheme of the downlink data based on the channel state information from the user terminals 20. To be more specific, the scheduling section 102 may determine the modulation scheme of the downlink data for the user terminals 20 to non-orthogonal-multiplex, per wideband (the third example). Alternatively, the scheduling section 102 may determine the modulation scheme of the downlink data for the user terminals 20 to non-orthogonal-multiplex, on a per subband basis (the first example and the second example).

The downlink data generating section 103 generates downlink user data for the user terminals 20. To be more specific, the downlink data generating section 103 encodes the downlink data for the user terminals 20 by the coding rates determined in the scheduling section 102. For example, the downlink data generating section 103 may encode the downlink data for the user terminals 20 to non-orthogonal-multiplex by coding rates that are determined per wideband (the first example and the third example). Also, the downlink data generating section 103 may encode the downlink data for the user terminals 20 to non-orthogonal-multiplex by coding rates that are determined on a per subband basis (the second example).

Also, the downlink data generating section 103 modulates the downlink data for the user terminals 20 by the modulation schemes determined in the scheduling section 102. For example, the downlink data generating section 103 may modulate the downlink data for the user terminals 20 to non-orthogonal-multiplex by modulation schemes that are determined per wideband (the third example). Alternatively, the downlink data generating section 103 may modulate the downlink data for the e user terminals 20 to non-orthogonal-multiplex by modulation schemes that are determined on a per subband basis (the first example and the second example).

Also, the downlink data generating section 103 maps the modulated downlink data for the user terminals 20 to radio resources (for example, resource blocks). Note that the downlink data generated in the downlink data generating section 103 may contain higher layer control information of the RRC layer and the MAC layer. This higher layer control information may include information that is controlled semi-statically, such as coding rates in wideband units, the total transmission power of each subband, and so on.

The DCI generating section 104 generates control signals. To be more specific, the DCI generating section 104 generates downlink control information (DCI) that represents at least one of the transmission power, modulation schemes and coding rates that are determined in the scheduling section 102.

Also, the DCI generating section 104 may joint-encode the transmission power and modulation schemes that are determined on a per subband basis, for each user terminal 20 that is non-orthogonal-multiplexed. To be more specific, the DCI generating section 104 may acquire the indices (MPS indices) that indicate the transmission power and modulation schemes of the user terminals 20, from the MPS table memorized in the memory section 105 (see FIG. 8), and generate DCI that includes these indices. Note that this joint encoding may be carried out on a per subband basis, or may be carried out collectively for all subbands.

For example, when m user terminals 20 are non-orthogonal-multiplexed and n subbands are provided, the DCI generating section 104 may joint-encode the transmission power $P_{k,b}$ and the modulation scheme $M_{k,b}$ of the b-th subband ($1 \leq b \leq n$) of the k-th user terminal 20 ($1 \leq k \leq m$) (see FIG. 8). Alternatively, the DCI generating section 104 may joint-encode the transmission power $P_{k,b}$ ($\forall b$) and the modulation schemes $M_{k,b}$ ($\forall b$) of all subbands of the k-th user terminal 20.

Also, the DCI generating section 104 may collectively joint-encode the transmission power and modulation schemes, which are determined on a per subband basis, of all user terminals 20 that are non-orthogonal-multiplexed. To be more specific, the DCI generating section 104 may acquire the indices (MPS indices) to indicate the transmission power and modulation schemes of all user terminals 20, from the MPS table (see FIGS. 9 and 10) memorized in the memory section 105, and generate DCI that includes these indices. This joint-encoding may be carried out on a per subband basis, or may be carried out collectively for all subbands.

For example, when m user terminals 20 are non-orthogonal-multiplexed and n subbands are provided, the DCI generating section 104 may joint-encode the transmission power $P_{k,b}$ ($\forall k$) and modulation schemes $M_{k,b}$ ($\forall k$) of the b-th subbands ($1 \leq b \leq n$) of all user terminals 20 (see FIGS. 9 and 10). Also, the DCI generating section 104 may joint-encode the transmission power $P_{k,b}$ ($\forall k,b$) and modulation schemes $M_{k,b}$ ($\forall k,b$) of all subbands of all user terminals 20.

Also, the DCI generating section 104 may joint-encode the transmission power, modulation schemes and coding rates that are determined on a per subband basis, per user terminal 20 that is non-orthogonal-multiplexed. To be more specific, the DCI generating section 104 may acquire the indices (MCPS indices) that indicate the transmission power, modulation schemes and coding rates of the user terminals 20 from the MCPS table (see FIG. 13) memorized in the memory section 105, and generate DCI that includes these indices. This joint-encoding may be carried out on a per subband basis, or may be carried out collectively for all subbands.

For example, when m user terminals 20 are non-orthogonal-multiplexed and n subbands are provided, the DCI generating section 104 may joint-encode the transmission power $P_{k,b}$, the modulation scheme $M_{k,b}$ and the coding rate $C_{k,b}$ of the b-th subband (1≤b≤n) of the k-th user terminal 20 (1≤k≤m) (see FIG. 13). Alternatively, the DCI generating section 104 may joint-encode the transmission power $P_{k,b}$ (∀b), the modulation schemes $M_{k,b}$ (∀b) and the coding rates $C_{k,b}$ (∀b) of all subbands of the k-th user terminal 20.

Also, the DCI generating section 104 may collectively joint-encode the transmission power, modulation schemes and coding rates, which are determined on a per subband basis, of all user terminals 20 that are non-orthogonal-multiplexed. To be more specific, the DCI generating section 104 may acquire the indices (MCPS indices) that indicate the transmission power, modulation schemes and coding rates of all user terminals 20, from the MCPS table memorized in the memory section 105, and generate DCI that includes these indices. This joint-encoding may be carried out on a per subband basis, or may be carried out collectively for all subbands.

For example, when m user terminals 20 are non-orthogonal-multiplexed and n subbands are provided, (the DCI generating section 104 may joint-encode the transmission power $P_{k,b}$ (∀k), the modulation schemes $M_{k,b}$ (∀k) and the coding rates $C_{k,b}$ (∀k) of the b-th subbands (1≤b≤n) of all user terminals 20. Also, DCI generating section 104 may joint-encode the transmission power $P_{k,b}$ (∀k,b), modulation schemes $M_{k,b}$ (∀kJ)) and coding rates $C_{k,b}$ (∀k,b) of all subbands of all user terminals 20.

Also, the DCI generating section 104 may collectively joint-encode the transmission power of all subbands, which is determined on a per subband basis, per user terminal 20 that is non-orthogonal-multiplexed. To be more specific, the DCI generating section 104 may acquire the indices (PS indices) that indicate the transmission power of the user terminals 20 from the PS table memorized in the memory section 105, and generate DCI that includes these indices.

For example, when m user terminals 20 are non-orthogonal-multiplexed and n subbands are provided, the DCI generating section 104 may joint-encode the transmission power $P_{k,b}$ (∀b) of all subbands of the k-th user terminal 20 (1≤k≤m).

Also, the DCI generating section 104 may collectively joint-encode the transmission power of all subbands, which is determined on a per subband basis, for all user terminals 20 that are non-orthogonal-multiplexed. To be more specific, the DCI generating section 104 may acquire the indices (PS indices) that indicate the transmission power of all user terminals 20 from the PS table memorized in the memory section 105, and generate DCI that includes these indices. This joint-encoding may be carried out on a per subband basis, or may be carried out collectively for all subbands.

For example, when m user terminals 20 are non-orthogonal-multiplexed and n subbands are provided, the DCI generating section 104 may joint-encode the transmission power $P_{k,b}$ (∀k) of the b-th subbands (1≤b≤n) of all user terminals 20. Also, the DCI generating section 104 may joint-encode the transmission power $P_{k,b}$ (∀k,b) of all subbands of all user terminals 20.

The memory section 105 memorizes various kinds of information and tables. To be more specific, the memory section 105 may memorize a table (MPS table) which, as illustrated in FIG. 8, defines combinations of transmission power (transmission power level) and modulation schemes, and indices (MPS indices) to indicate these combinations. Also, the memory section 105 may memorize a MPS table which, as illustrated in FIG. 9, defines combinations of the transmission power (transmission power level) and modulation schemes of a plurality of user terminals 20, and MPS indices to indicate these combinations. Also, the memory section 105 may memorize a MPS table which, as illustrated in FIG. 10, defines combinations of the transmission power (transmission power level) of one user terminal 20 and the modulation schemes of both user terminal 20, and MPS indices to indicate these combinations. Note that the transmission power and modulation schemes memorized in the MPS table may include the transmission power and modulation schemes of all subbands.

Also, the memory section 105 may memorize a table (MCPS table) which, as illustrated in FIG. 13, defines combinations of transmission power (transmission power level), modulation schemes and coding rates, and indices (MCPS indices) to indicate these combinations. Also, the memory section 105 may memorize a MCPS table that defines combinations of the transmission power (transmission power level), modulation schemes and coding rates of a plurality of user terminals 20, and MCPS indices to indicate these combinations. Note that the transmission power, modulation schemes and coding rates to be memorized in the MCPS table may include the transmission power, modulation schemes and coding rates of all subbands.

Also, the memory section 105 may memorize a table (PS table) that defines combinations of the transmission power (transmission power level) of a plurality of user terminals 20, and indices (PS (Power Set) indices) to indicate these combinations. Note that the transmission power memorized in the MPS table may include the transmission power of all subbands.

The transmission section 106 transmits the downlink data generated in the downlink data generating section 103, and the DCI that is generated in the DCI generating section 104. To be more specific, the transmission section 106 may transmit the downlink data by using a downlink shared channel (PDSCH), or transmit the DCI by using a downlink control channel (PDCCH). Also, the transmission section 106 may transmit reference signals (for example, CRSs, CSI-RSs, DM-RSs and so on).

As illustrated in FIG. 17, the user terminal 20 has a receiving section 201, a channel state information (CSI) estimation section 202, a demodulation section 203, a memory section 204 and a transmission section 205.

The receiving section 201 receives received signals from the radio base stations 10, and separates the control signals (for example, the PDCCH) and the data signals (for example, the PDSCH). To be more specific, the receiving section 201 may perform blind decoding of the search space of the PDCCH, and acquires the downlink control information (DCI). Also, the receiving section 201 may receive the reference signals (for example, the CRSs, CSI-RSs, DM-RSs and so on).

The CSI estimation section 202 estimates channel states. To be more specific, the CSI estimation section 202 estimates channel states on a per subband basis, and outputs channel state information representing the estimated channel states, to the transmission section 205. Also, the CSI estimation section 202 estimates the channel state of a wideband, which includes a plurality of subbands, and outputs channel state information representing the estimated channel state to the transmission section 205.

The demodulation section 203 may carry out the demodulation, decoding and interference cancellation (for example, SIC) of the data signals (for example, the PDSCH) received in the receiving section 201. To be more specific, the demodulation section 203 demodulates and decodes the downlink data based on DCI, which represents at least one of the transmission power, the modulation schemes and the coding rates.

For example, the demodulation section 203 acquires the transmission power and modulation schemes corresponding to the MPS indices included in the DCI, from the MPS table memorized in the memory section 204 (see FIG. 8). The demodulation section 203 cancels interference based on the transmission power that is acquired. Also, the demodulation section 203 demodulates the downlink data based on the modulation schemes that are acquired. In this case, the demodulation section 203 demodulates the downlink data based on the coding rates that are included in the DCI or in higher layer control information.

Also, the demodulation section 203 acquires the transmission power and modulation scheme of the subject terminal, from among the transmission power and modulation schemes corresponding to the MPS indices included in the DCI, from the MPS table memorized in the memory section 204 (see FIGS. 9 and 10). The demodulation section 203 may cancel interference based on the subject terminal's transmission power, and, furthermore, demodulate the downlink data based on the subject terminal's modulation scheme.

Note that the demodulation section 203 transmits the MPS information that is included in the DCI of each user terminal 20 such that, as illustrated in FIGS. 9 and 10, for example, the MPS index 1 (index 1) always represents information about the transmission power and modulation scheme of the subject terminal, and the MPS index 2 (index 2) always represents the transmission power and modulation scheme of an interfering terminal. Alternatively, by using an additional bit sequence to report to each user terminal 20 (one bit when there are two users), whether the MPS information that is reported to the subject terminal matches the index 1 or the index 2 is reported to the subject terminal. By this means, a user terminal is enabled to identify whether information that is reported to the MPS table is information pertaining to the subject terminal or an interfering terminal.

Also, the demodulation section 203 acquires the transmission power, modulation schemes and coding rates corresponding to the MCPS indices included in the DCI, from the MCPS table memorized in the memory section 204 (see FIG. 13). The demodulation section 203 cancels interference based on the transmission power that is acquired. Also, the demodulation section 203 acquires the downlink data based on the modulation schemes that are acquired, and decodes the downlink data based on the coding rates that are acquired.

Also, the demodulation section 203 acquires the transmission power, modulation scheme and coding rate of the subject terminal, from among the transmission power, modulation schemes and coding rates corresponding to the MCPS indices included in the DCI, from the MCPS table memorized in the memory section 204. The demodulation section 203 cancels interference based on the subject terminal's transmission power. Also, the demodulation section 203 may demodulate the downlink data based on the subject terminal's modulation scheme. Note that the MCPS information included in the DCI may be configured so that the MCPS index 1 (index 1) always represents the transmission power, modulation scheme and coding rate of the subject terminal. Alternatively, it is equally possible to add a bit sequence that can identify whether the transmission power, modulation scheme and coding rate that are included in MCPS information are information pertaining to the subject terminal or an interfering terminal.

Also, the demodulation section 203 acquires the transmission power corresponding to the PS indices included in the DCI, from the PS table memorized in the memory section 204. The demodulation section 203 cancels interference based on the transmission power that is acquired. In this case, the demodulation section 203 demodulates the downlink data based on the coding rates and modulation schemes that are included in the DCI or in higher layer control information.

Also, the demodulation section 203 acquires the transmission power of the subject terminal, from among a plurality of transmission power corresponding to the PS indices included in the DCI, from the PS table memorized in the memory section 204. The demodulation section 203 cancels interference based on the subject terminal's transmission power. Note that the MCPS information that is included in the DCI may be configured so that the MCPS index 1 (index 1) always represents the subject terminal's transmission power. Alternatively, it is equally possible to add a bit sequence that can identify whether the transmission power that is included in MCPS information is information pertaining to the subject terminal or an interfering terminal.

The memory section 204 memorizes various kinds of information and tables. To be more specific, the memory section 204 memorizes a MPS table, a MCPS table, a PS table and so on, similar to the memory section 105.

The transmission section 205 transmits the channel state information estimated in the CSI estimation section 202, to the radio base stations 10. To be more specific, the transmission section 205 transmits the channel state information by using an uplink shared channel (PUSCH) or an uplink control channel (PUCCH).

As described above, with the radio communication system 1 according to the present embodiment, the transmission power of downlink data for user terminals 20 that are non-orthogonal-multiplexed per subband is determined on a per subband basis, so that it is possible to control the interference between the non-orthogonal-multiplexed user terminals 20 sufficiently.

Note that, although a radio communication system to use non-orthogonal multiple access (NOMA) has been described above with the present embodiment, this is by no means limiting. The radio communication system according to the present embodiment is adequately applicable to radio communication systems that use orthogonal multiple access such as OFDMA as well. When the orthogonal multiple access according to the present embodiment is used, it is possible to control interference between cells sufficiently.

The present invention can be implemented with various corrections and in various modifications, without departing from the spirit and scope of the present invention. That is to say, the descriptions herein are provided only for the purpose of illustrating examples, and should by no means be construed to limit the present invention in any way.

The disclosure of Japanese Patent Application No. 2013-078686, filed on Apr. 4, 2013, including the specification, drawings and abstract, is incorporated herein by reference in its entirety.

The invention claimed is:

1. A user terminal comprising:
a receiver that receives a downlink control information including an index; and a processor that decodes a first downlink data signal based on the downlink control information, wherein the index is used by the processor to:
- determine a transmission power corresponding to a modulation scheme of the first downlink data signal for the user terminal; and
- determine that interference from a second downlink data signal for another user terminal is superposed over a same radio resource onto the first downlink data signal, wherein the first downlink data signal and the second downlink data signal are multiplexed by applying varying transmission power, and wherein the processor samples the first downlink data signal for the user terminal by canceling the second downlink signal for the another user terminal.

2. The user terminal according to claim 1, further comprising:
a memory that stores a table that associates the index with the modulation scheme to determine a level of the transmission power, wherein the processor obtains from the table the level based on the index included in the downlink control information and the modulation scheme of the downlink data signal, and determines the transmission power based on the obtained level.

3. The user terminal according to claim 1, wherein the user terminal is located at a central part of a cell.

4. The user terminal according to claim 2, wherein the user terminal is located at a central part of a cell.

5. A radio base station comprising:
a processor that modulates a first downlink data signal for a user terminal; and
a transmitter that transmits a downlink control information including an index, wherein the index is used by the user terminal to:
- determine a transmission power corresponding to a modulation scheme of the first downlink data signal for the user terminal; and
- determine that interference from a second downlink data signal for another user terminal is superposed over a same radio resource onto the first downlink data signal, wherein the first downlink data signal and the second downlink data signal are multiplexed by applying varying transmission power, and wherein the user terminal samples the first downlink data signal for the user terminal by canceling the second downlink signal for the another user terminal.

6. A radio communication method for a user terminal comprising:
receiving a downlink control information including an index; and
decoding the first downlink data signal based on the downlink control information, wherein the index is used by the user terminal to:
- determine a transmission power corresponding to a modulation scheme of the first downlink data signal for the user terminal; and
- determine that interference from a second downlink data signal for another user terminal is superposed over a same radio resource onto the first downlink data signal, wherein the first downlink data signal and the second downlink data signal are multiplexed by applying varying transmission power, and wherein the method further includes sampling the first downlink data signal for the user terminal by canceling the second downlink signal for the another user terminal.

* * * * *